US012597096B2

(12) United States Patent (10) Patent No.: US 12,597,096 B2
Pouyanfar et al. (45) Date of Patent: Apr. 7, 2026

(54) REAL-TIME FACIAL RESTORATION AND RELIGHTING IN VIDEOS USING FACIAL ENHANCEMENT NEURAL NETWORKS

(71) Applicant: Microsoft Technology Licensing, LLC, Redmond, WA (US)

(72) Inventors: Samira Pouyanfar, San Jose, CA (US); Sunando Sengupta, Berkshire (GB); Eric Chris Wolfgang Sommerlade, Oxford (GB); Anjali S. Parikh, Redmond, WA (US); Ebey Paulose Abraham, Oxford (GB); Brian Timothy Hawkins, Sammamish, WA (US); Mahmoud Mohammadi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 18/188,050

(22) Filed: Mar. 22, 2023

(65) Prior Publication Data

US 2024/0331094 A1 Oct. 3, 2024

(51) Int. Cl.
G06T 5/50 (2006.01)
G06T 5/70 (2024.01)
(Continued)

(52) U.S. Cl.
CPC .................. G06T 5/50 (2013.01); G06T 5/70 (2024.01); G06T 5/73 (2024.01); G06T 7/194 (2017.01);
(Continued)

(58) Field of Classification Search
CPC .... G06T 5/50; G06T 5/70; G06T 5/73; G06T 7/194; G06T 2207/20081;
(Continued)

(56) References Cited

U.S. PATENT DOCUMENTS 8,224,039 B2 * 7/2012 Ionita ................. G06V 10/7557
382/118
11,488,288 B1 * 11/2022 Heo ...................... G06V 40/172
(Continued)

FOREIGN PATENT DOCUMENTS

CN 114495201 A * 5/2022
CN 114998124 A * 9/2022 ............... G06N 3/08
(Continued)

OTHER PUBLICATIONS

Zhang, et al., "Beyond a Gaussian Denoiser: Residual Learning of Deep CNN for Image Denoising", In Proceedings of IEEE Transactions on Image Processing vol. 26, Issue 7, Feb. 1, 2017, pp. 3142-3155.
(Continued)

*Primary Examiner* — Jose L Couso
(74) *Attorney, Agent, or Firm* — Ray Quinney & Nebeker P.C; Christopher K. Hallstrom

(57) ABSTRACT

The present disclosure relates to an image restoration system that efficiently and accurately produces high-quality images captured under low-light and/or low-quality environmental conditions. To illustrate, when a user is in a low-lit environment and participating in a video stream, the image restoration system enhances the quality of the image by dynamically re-lighting the user's face. Moreover, it significantly enhances the image quality to the extent that other users viewing the video stream are unaware of the poor environmental conditions of the user. In addition, the image restoration system creates and utilizes an image restoration machine-learning model to improve the quality of low-quality images by re-lighting and restoring them in real time. Various implementations combine an autoencoder model with a distortion classifier model to create the image restoration machine-learning model.

20 Claims, 11 Drawing Sheets

(51) Int. Cl.
    *G06T 5/73*        (2024.01)
    *G06T 7/194*       (2017.01)
    *G06V 40/16*       (2022.01)
(52) U.S. Cl.
    CPC .. *G06V 40/167* (2022.01); *G06T 2207/20081*
                                                    (2013.01)
(58) Field of Classification Search
    CPC . G06T 2207/10016; G06T 2207/20084; G06T
              2207/20201; G06T 2207/20208; G06T
              2207/30201; G06T 5/90; G06T 5/60;
              G06T 2207/10024; G06T 2207/10048;
              G06T 2207/20221; G06T 15/506; G06T
              15/80; G06T 3/4046; G06T 9/002; G06T
              2207/20076; G06V 40/167; G06V
              40/172; G06V 10/30; G06V 10/24; G06V
              10/82; G06V 10/143; G06V 30/142;
              G06V 10/454; G06V 10/54; G06V
              10/774; G06V 20/41; G06V 30/18057;
              G06V 20/698; G06V 30/19173; H04N
              23/60; H04N 23/70; H04N 23/73; H04N
              23/76; H04N 23/951; H04N 5/265; H04N
              9/646; G06N 3/02; G06N 3/08–088;
              G06N 3/0445; G06N 3/0454; G06N
              3/0464; G06N 3/4046; G06N 3/4053;
              G06N 7/00; G06N 7/01; G06N 20/00;
    G06K 7/1482; G06F 18/214; G06F 18/22;
              G06F 18/241; G06F 18/24; G06F
              18/2411; G06F 18/2415; G06F 30/27;
                                         Y10S 128/925
    See application file for complete search history.

(56)                References Cited

U.S. PATENT DOCUMENTS

| 11,869,275 | B1 * | 1/2024 | Joseph | G06V 40/172 |
|---|---|---|---|---|
| 11,983,853 | B1 * | 5/2024 | Zhu | G06T 5/70 |
| 2013/0050395 | A1 * | 2/2013 | Paoletti | H04N 7/142 |
| | | | | 348/E7.083 |
| 2021/0001810 | A1 * | 1/2021 | Rivard | G06V 40/172 |
| 2021/0209344 | A1 * | 7/2021 | Guo | G06N 3/045 |
| 2022/0157012 | A1 * | 5/2022 | Ghosh | G06N 3/088 |
| 2023/0316477 | A1 * | 10/2023 | Wu | G06T 5/73 |
| | | | | 382/284 |
| 2023/0360182 | A1 * | 11/2023 | Fanello | G06T 5/92 |

FOREIGN PATENT DOCUMENTS

| CN | 115359525 | A | * | 11/2022 | |
|---|---|---|---|---|---|
| CN | 115830325 | A | * | 3/2023 | |
| WO | WO-2021093712 | A1 | * | 5/2021 | G06T 5/50 |

OTHER PUBLICATIONS

Zhang, et al., "Multi-Modality Deep Restoration of Extremely Compressed Face Videos", In Proceedings of IEEE Transactions on Pattern Analysis and Machine Intelligence vol. 45, Issue 2, Mar. 8, 2022, pp. 2024-2037.
Zhang, et al. "Plug-and-Play Image Restoration With Deep Denoiser Prior", In Proceedings of IEEE Transactions on Pattern Analysis and Machine Intelligence vol. 44, Issue 10, Jun. 14, 2021, pp. 6360-6376.
Zhang, et al., "Residual Dense Network for Image Super-Resolution", In Proceedings of IEEE/CVF Conference on Computer Vision and Pattern, Jun. 18, 2018, pp. 2472-2481.
Zhang, et al., "The Unreasonable Effectiveness of Deep Features as a Perceptual Metric", In Proceedings of IEEE/CVF Conference on Computer Vision and Pattern Recognition, Jun. 18, 2018, pp. 586-595.

Zhou, et al., "Towards Robust Blind Face Restoration with Codebook Lookup Transformer", In Proceedings Advances in Neural Information Processing Systems, Oct. 31, 2022, 13 Pages.
Zhu, et al., "Blind Face Restoration via Integrating Face Shape and Generative Priors", In Proceedings of IEEE/CVF Conference on Computer Vision and Pattern Recognition, Jun. 18, 2022, pp. 7652-7661.
Zhuang, et al., "Surrogate Gap Minimization Improves Sharpness-Aware Training", In Proceedings of International Conference on Learning Representations, Jan. 29, 2022, 24 Pages.
International Search Report and Written Opinion received for PCT Application No. PCT/US2024/019312, Jun. 24, 2024, 16 pages.
Teng, et al., "Blind face restoration via multi-prior collaboration and adaptive feature fusion," Frontiers in Neurorobotics 16, Article 797231, Feb. 2022, pp. 1-18.
Toledo, et al., "Face Reconstruction with Variational Autoencoder and Face Masks," arXiv preprint arXiv:2112.02139, 2021, Dec. 3, 2021, 12 pages.
Wang, et al., "Panini-Net: GAN Prior Based Degradation-Aware Feature Interpolation for Face Restoration," arXiv preprint: 2203.08444, 2022, Mar. 16, 2022, 9 pages.
"Snapdragon Neural Processing Engine SDK", Retrieved From : https://developer.qualcomm.com/sites/default/files/docs/snpe/, Retrieved on: Sep. 14, 2022, 1 Page.
Atoum, et al., "Color-Wise Attention Network for Low-Light Image Enhancement", In Proceedings of IEEE/CVF Conference on Computer Vision and Pattern Recognition Workshops, Jun. 14, 2020, pp. 2130-2139.
Chan, et al., "GLEAN: Generative Latent Bank for Large-Factor Image Super-Resolution", In Proceedings of IEEE/CVF Conference on Computer Vision and Pattern Recognition, Jun. 20, 2021, pp. 14240-14249.
Chen, et al., "FSRNet: End-to-End Learning Face Super-Resolution with Facial Priors", Retrieved From : IEEE/CVF Conference on Computer Vision and Pattern Recognition, Jun. 18, 2018, pp. 2492-2501.
Chen, et al., "Progressive Semantic-Aware Style Transformation for Blind Face Restoration", In Proceedings of IEEE/CVF Conference on Computer Vision and Pattern Recognition, Jun. 20, 2021, pp. 11891-11900.
Chen, et al., "When Vision Transformers Outperform ResNets without Pre-training or Strong Data Augmentations", In Repository of arXiv:2106.01548v2, Oct. 11, 2021, 19 Pages.
Dogan, et al., "Exemplar Guided Face Image Super-Resolution Without Facial Landmarks", In Proceedings of IEEE/CVF Conference on Computer Vision and Pattern Recognition Workshops, Jun. 16, 2019, pp. 1814-1823.
Dong, et al., "Deep Wiener Deconvolution: Wiener Meets Deep Learning for Image Deblurring", In Proceedings of Advances in Neural Information Processing Systems, Dec. 6, 2020, 12 Pages.
Dosovitskiy, et al., "An Image Is Worth 16×16 Words: Transformers for Image Recognition at Scale", In International Conference on Learning Representations, Jun. 3, 2021, 21 Pages.
Fan, et al., "FaceFormer: Speech-Driven 3D Facial Animation with Transformers", In Proceedings of IEEE/CVF Conference on Computer Vision and Pattern Recognition, Jun. 18, 2022, pp. 18749-18758.
Fu, et al., "An Efficient Hybrid Model for Low-light Image Enhancement in Mobile Devices", In Proceedings of IEEE/CVF Conference on Computer Vision and Pattern Recognition Workshops, Jun. 19, 2022, pp. 3056-3065.
Gu, et al., "VQFR: Blind Face Restoration with Vector-Quantized Dictionary and Parallel Decoder", In Proceedings of Computer Vision—ECCV 2022: 17th European Conference, Oct. 23, 2022, 17 Pages.
Guo, et al., "Zero-Reference Deep Curve Estimation for Low-Light Image Enhancement", In Proceedings of IEEE/CVF Conference on Computer Vision and Pattern Recognition, Jun. 13, 2020, pp. 1777-1786.
He, et al., "GCFSR: a Generative and Controllable Face Super Resolution Method Without Facial and GAN Priors", In Proceedings of IEEE/CVF Conference on Computer Vision and Pattern Recognition, Jun. 18, 2022, pp. 1879-1888.

(56)         References Cited

OTHER PUBLICATIONS

He, et al., "Mask r-cnn", In Proceedings of the IEEE International Conference on Computer Vision, Oct. 22, 2017, pp. 2961-2969.

Helou, et al., "Stochastic Frequency Masking to Improve Super-Resolution and Denoising Networks", In Proceedings of Computer Vision—ECCV: 16th European Conference, Aug. 23, 2020, 18 Pages.

Huang, et al., "Neural Compression-Based Feature Learning for Video Restoration", In Proceedings of IEEE/CVF Conference on Computer Vision and Pattern Recognition, Jun. 18, 2022, pp. 5862-5871.

Johnson, et al., "Perceptual Losses for Real-Time Style Transfer and Super-Resolution", In Proceedings of European Conference on Computer Vision, Oct. 11, 2016, pp. 694-711.

Karras, et al., "A style-based generator architecture for generative adversarial networks", In Proceedings of IEEE Conference on Computer Vision and Pattern Recognition, Jun. 15, 2019, pp. 4396-4405.

Karras, et al., "Analyzing and Improving the Image Quality of StyleGAN", In Proceedings of IEEE/CVF Conference on Computer Vision and Pattern Recognition, Jun. 13, 2020, pp. 8107-8116.

Kupyn, et al., "DeblurGAN: Blind Motion Deblurring Using Conditional Adversarial Networks", In Proceedings of the IEEE conference on computer vision and pattern recognition, Jun. 18, 2018, pp. 8183-8192.

Lee, et al., "KNN Local Attention for Image Restoration", In Proceedings of IEEE/CVF Conference on Computer Vision and Pattern Recognition, Jun. 18, 2022, pp. 2129-2139.

Li, et al., "Blind Face Restoration via Deep Multi-scale Component Dictionaries", In Proceedings of Computer Vision 16th European Conference, Aug. 23, 2020, pp. 399-415.

Liang, et al., "Swinir: Image restoration using swin transformer", In Proceedings of 2021 IEEE/CVF International Conference on Computer Vision Workshops, Oct. 11, 2021, pp. 1833-1844.

Liu, et al., "Non-Local Recurrent Network for Image Restoration", In Proceedings of Advances in Neural Information Processing Systems, Dec. 3, 2018, 10 Pages.

Matsuoka, et al., "Transformed-Domain Robust Multiple-Exposure Blending With Huber Loss", In Proceedings of IEEE Access, Nov. 6, 2019, pp. 162282-162296.

Mei, et al., "Image Super-Resolution with Non-Local Sparse Attention", Retrieved From : IEEE/CVF Conference on Computer Vision and Pattern Recognition, Jun. 20, 2020, pp. 3516-3525.

Menon, et al., "Pulse: Self-Supervised Photo Upsampling via Latent Space Exploration of Generative Models", In Proceedings of the ieee/cvf Conference on Computer Vision and Pattern Recognition, Jun. 13, 2020, pp. 2437-2445.

Milletari, et al., "V-Net: Fully Convolutional Neural Networks for Volumetric Medical Image Segmentation", In Proceedings of Fourth International Conference on 3D Vision, Oct. 1, 2016, 11 Pages.

Nan, et al., "Variational-EM-Based Deep Learning for Noise-Blind Image Deblurring", In Proceedings of IEEE/CVF Conference on Computer Vision and Pattern Recognition, Jun. 13, 2020, pp. 3623-3632.

Pang, et al., "Recorrupted-to-Recorrupted: Unsupervised Deep Learning for Image Denoising", In Proceedings of IEEE/CVF Conference on Computer Vision and Pattern Recognition, Jun. 20, 2021, pp. 2043-2052.

Parkhi, et al., "Deep Face Recognition", In Proceedings of the British Machine Vision Conference, Sep. 2015, 12 Pages.

Shi, et al., "Real-Time Single Image and Video Super-Resolution Using an Efficient Sub-Pixel Convolutional Neural Network", In Proceedings of the IEEE Conference on Computer Vision and Pattern Recognition, Jun. 27, 2016, pp. 1874-1883.

Sidorov, et al., "Artificial Color Constancy Via Googlenet with Angular Loss Function", In Journal of Applied Artificial Intelligence, vol. 34, issue 9, Jul. 28, 2020, 14 Pages.

Steiner, et al., "How to train your ViT? Data, Augmentation, and Regularization in Vision Transformers", In Proceedings of arXiv:2106.10270v1, Jun. 18, 2021, 14 Pages.

Sudre, et al., "Generalised Dice Overlap as a Deep Learning Loss Function for Highly Unbalanced Segmentations", In Proceedings of Deep Learning in Medical Image Analysis and Multimodal Learning for Clinical Decision Support: Third International Workshop, Sep. 14, 2017, 13 Pages.

Tassano, et al., "DVDNET: A Fast Network for Deep Video Denoising", In Proceedings of IEEE International Conference on Image Processing, Sep. 22, 2019, pp. 1805-1809.

Tolstikhin, et al., "MLP-Mixer: An all-MLP Architecture for Vision", In Proceedings of arXiv:2105.01601v4, Jun. 11, 2021, 16 Pages.

Wang, et al., "Panini-net: Gan Prior Based Degradation-Aware Feature Interpolation for Face Restoration", In Proceedings of the AAAI Conference on Artificial Intelligence, vol. 36, Issue 3, Jun. 28, 2022, pp. 2576-2584.

Wang, et al., "Towards Real-World Blind Face Restoration with Generative Facial Prior", In Proceedings of IEEE/CVF Conference on Computer Vision and Pattern Recognition, Jun. 20, 2021, pp. 9164-9174.

Wang, "Uformer: A General U-Shaped Transformer for Image Restoration", In Proceedings of IEEE/CVF Conference on Computer Vision and Pattern Recognition, Jun. 18, 2022, pp. 17662-17672.

Yang, et al., "From Fidelity to Perceptual Quality: A Semi-Supervised Approach for Low-Light Image Enhancement", In Proceedings of IEEE/CVF Conference on Computer Vision and Pattern Recognition, Jun. 13, 2020, pp. 3060-3069.

Yang, et al., "GAN Prior Embedded Network for Blind Face Restoration in the Wild", In Proceedings of IEEE/CVF Conference on Computer Vision and Pattern Recognition, Jun. 20, 2021, pp. 672-681.

Yang, et al., "HiFaceGAN: Face Renovation via Collaborative Suppression and Replenishment", In Proceedings of the 28th ACM International Conference on Multimedia, Oct. 12, 2020, 11 Pages.

Yu, et al., "Cascading Convolutional Color Constancy", In Proceedings of the AAAI Conference on Artificial Intelligence, vol. 34, Issue 7, Apr. 3, 2020, pp. 12725-12732.

Yu, et al., "Face Super-Resolution Guided by Facial Component Heatmaps", In Proceedings of the European Conference on Computer Vision, Sep. 8, 2018, 17 Pages.

Yu et al., "Path-Restore: Learning Network Path Selection for Image Restoration", In Proceedings of IEEE Transactions on Pattern Analysis and Machine Intelligence vol. 44, Issue 10, Jul. 13, 2021, pp. 7078-7092.

Zameer, et al., "Restormer: Efficient Transformer for High-Resolution Image Restoration", In Proceedings IEEE/CVF Conference on Computer Vision and Pattern Recognition, Jun. 18, 2022, pp. 5718-5729.

Zhai, et al., "LiT: Zero-Shot Transfer with Locked-image text Tuning", In Repository of arXiv:2111.07991v3, Jun. 22, 2022, 26 Pages.

International Preliminary Report on Patentability (Chapter I) received for PCT Application No. PCT/US2024/019312, mailed on Oct. 2, 2025, xx pages.

Li, et al., "Learning Warped Guidance for Blind Face Restoration", In Proceedings of the European Conference on Computer Vision, Part XIII, Sep. 2018, 18 Pages.

* cited by examiner

100

200

[H, W, D]        [H, W, D] _402_        [2H, 2W, D/4] _404_

Dense Block Layer _410_

Input Image *606*    Image Restoration Model *608*    State-Of-The-Art Systems *610*    Ground Truth *612*

602

604

REAL-TIME FACIAL RESTORATION AND RELIGHTING IN VIDEOS USING FACIAL ENHANCEMENT NEURAL NETWORKS

BACKGROUND

Recent years have seen significant hardware and software advancements in digital communications, particularly in the area of video streaming. For example, individuals are increasingly participating in remote meetings that rely on video conferencing tools. While existing systems are improving, they often stream poor-quality videos due to both internal and external factors. For instance, if an individual is in a poorly lit environment, such as a dark room or a room with poor lighting conditions, the video quality will suffer, making individuals difficult to see. In particular, the lack of light on a subject increases blurriness, noise, distortion, and artifacts in video images. Further, even in ideal environments, lower-quality hardware components, such as a poor-quality web camera, can produce subpar videos and images. As a result, existing systems have to spend a large amount of computer resources in an attempt to correct low-quality image issues, which also causes added latency and delay. Further, in such situations, despite these and other efforts, existing systems commonly fail to provide high-quality video streams as well as experience other issues.

BRIEF DESCRIPTION OF THE DRAWINGS

The detailed description provides additional specificity and detail for one or more implementations through the use of the accompanying drawings, as briefly described below.

DETAILED DESCRIPTION

Figure 1A:
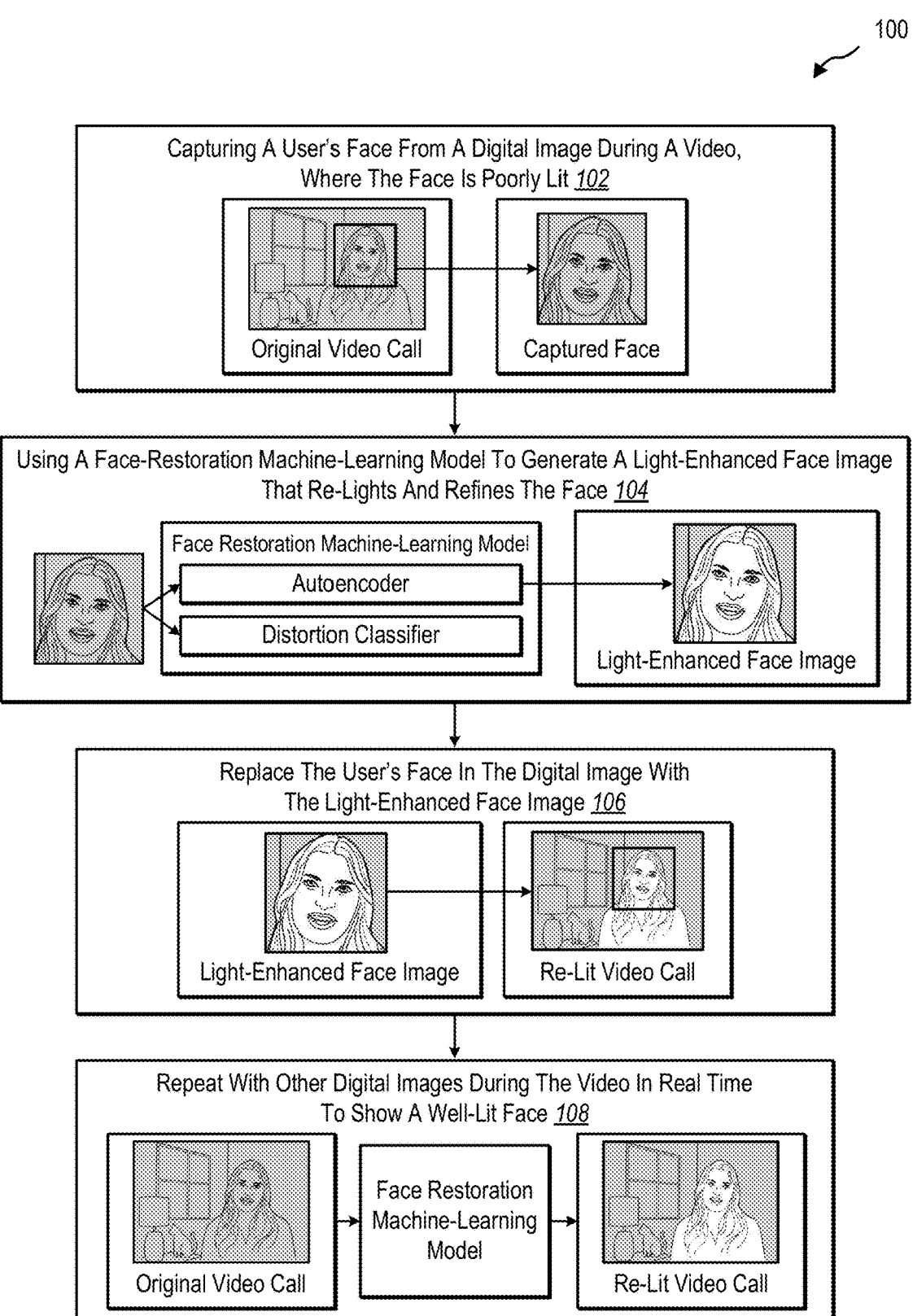
FIGS. 1A-1B illustrate example flow diagrams that provide an overview for implementing an image restoration system to restore and improve image quality in accordance with one or more implementations.

This disclosure describes an image restoration system that accurately and efficiently generates high-quality images captured in low-quality and/or low-light environmental conditions. For example, for a user in a low-lit environment participating in a video stream, the image restoration system improves the quality of the image by dynamically re-lighting the user's face as well as further enhances the image quality such that, among other benefits, other users viewing the video stream are unaware of the poor environmental conditions of the user. For instance, in some instances, the image restoration system simulates the addition of physical light to illuminate a subject being captured by a camera. Further, the image restoration system provides improved image accuracy over existing systems while also being more efficient and significantly faster than existing systems.

For context, the image restoration system provides image enhancement and, in particular, face enhancement techniques that restore and recover high-quality images captured in low-quality and/or low-light environmental conditions. In addition to the technical benefits of improved accuracy and efficiency, which are detailed below, enhancing the quality of faces in videos and images significantly improves the user experience in numerous applications. These applications include video conferencing, mobile applications, various displays, and cameras. The image restoration system corrects deficiencies caused by different conditions that affect video quality, including lighting/exposure (e.g., dark room, windows, and lamps), blurriness issues (e.g., a camera loses focus, people movement), distance from the camera that decreases the quality of the face, different camera resolutions, and many more real-world scenarios.

More specifically, the image restoration system generates and utilizes an image restoration machine-learning model to enhance the quality of low-quality images by re-lighting and restoring the images in real time. In various instances, the image restoration machine-learning model is a neural network that corrects various issues such as low light, reflected colored light, image distortions, image noise, blurriness, poor exposure, and other related issues, resulting in enhanced images that accurately reflect the original scene. In many instances, the image restoration system generates an image restoration machine-learning model that is significantly smaller, more efficient, and more accurate than existing systems. In various implementations, the image restoration machine-learning model is implemented by combining an autoencoder model paired with a distortion classifier model.

As an example, the image restoration system identifies an image that includes a face of a user and an image background and detects (and in some cases crops) the face within the image. The system then utilizes a face restoration machine-learning model to generate a light-enhanced face image. To achieve this, the system combines an autoencoder and a distortion classifier within the face restoration machine-learning model. Additionally, the system generates an enhanced digital image by combining the light-enhanced face image with the image background. Finally, the enhanced digital image is provided for display on a computing device, such as the user's client device and/or the devices of other user(s) participating in the video call.

As a note, the following document largely discusses the image restoration system in terms of re-lighting a face within an image. However, similar approaches and techniques as those described in this document may be used to re-light other objects, including avatars generated from a user's face, within digital images. For example, for poorly lit objects, the image restoration system utilizes an object-image restoration machine-learning model having a similar autoencoder and distortion classifier to re-light and improve the appearance of the object within the digital image.

Implementations of the present disclosure aim to solve one or more of the problems mentioned above as well as other problems in the art. For example, various systems, computer-readable media, and methods utilize the image restoration system to re-light, restore, and/or recover low-quality images into high-quality, well-lit images. In particular, the image restoration system utilizes an image restoration machine-learning model having an autoencoder combined with output from a distortion classifier to generate highly accurate images. Further, the image restoration machine-learning model utilizes a model architecture that leads to significantly faster processing times than conventional systems.

To elaborate, the image restoration system provides several technical benefits in terms of computing accuracy and efficiency compared to existing computing systems. The image restoration system delivers benefits and solves problems associated with re-lighting, restoring, and recovering low-quality images captured in poor environments. In particular, the image restoration machine-learning model provides highly accurate images by utilizing an autoencoder combined with output from a distortion classifier. Furthermore, the image restoration system employs a model architecture that results in significantly faster speeds compared to conventional systems, providing practical applications for various industries.

As mentioned above, the image restoration system improves accuracy and efficiency over existing systems. To illustrate, the image restoration system generates and/or utilizes an image restoration machine-learning model, which is a light yet effective machine-learning model that enhances different types of distortions in digital images, such as light, down-sampling, and noise. Further, in many implementations, the image restoration machine-learning model operates in real-time.

To elaborate, the image restoration system generates an image restoration machine-learning model that efficiently balances accuracy (e.g., face quality) with computational costs. Many existing systems sacrifice accuracy, such as face quality, for computational efficiency or vice versa. For example, some existing systems are designed to recover very low-quality images by applying noise reduction and down-sampling, which can destroy and distort an image. Further, these existing systems are targeted toward consumer picture-taking where subjects are small and further away. Thus, when a subject's face occupies a large portion of an image, these existing systems overcorrect and produce inaccurate images.

Accordingly, compared to the existing systems, the image restoration system provides an improved balance between accuracy and latency. For example, in various implementations, the image restoration system generates an image restoration machine-learning model that utilizes model architecture having space-to-depth layers (space2depth) followed by convolutional neural network (CNN) layers on the encoder side of an autoencoder, as well as depth-to-space (depth2space) layers followed with dense layers on the decoder side of the autoencoder. In this way, the model architecture of the image restoration machine-learning model provides increased accuracy with low computational costs.

More particularly, in one or more implementations, by utilizing space-to-depth layers and the depth-to-space layers, the image restoration system maintains lossless spatial dimensionality when performing data reductions and data expansion. In contrast, most existing systems use classical down-sampling and up-sampling layers (e.g., bilinear, nearest neighbor), which causes information losses (e.g., inaccurate results). Moreover, the image restoration system quickly operates on small-capacity computing devices at speeds that are significantly faster than those of existing systems.

Some existing systems attempt to identify and correct third-party deblurring, denoising, or poorly lit images. However, these systems are limited to a small number of degradation types. In contrast, the image restoration system provides a full refiner model that corrects distortion caused by down-sampling, blur, light exposure, light changes, poor illumination, color distortion, chromatic degradation, Gaussian noise, and JPEG compression. Indeed, the image restoration system combines the output from a distortion classifier into an autoencoder to correct a range of distortions in images.

Further, in many implementations, the distortion classifier and the autoencoder are trained together to maximize their collaborative contributions to each other in improving image accuracy. In other words, in many instances, the image restoration system trains the distortion classifier together with the autoencoder to further guide the decoder of the autoencoder on how to recover from each specific distortion. As a result, the accuracy and efficiency of the image restoration machine-learning model are improved. Further, because of its targeted training, the image restoration system better handles realistic, real-world situations than existing systems. Indeed, the image restoration system trains based on real-world scenarios (e.g., video calls).

To further illustrate, by combining output from the distortion classifier into the autoencoder, in various implementations, the image restoration system avoids image artifacts as well as makes skin and face textures appear more realistic. For example, generative adversarial network (GAN) priors often add image artifacts and make the skin and face texture appear unrealistic. Accordingly, instead of using only using facial and GAN priors, as existing systems do, the image restoration system incorporates distortion class priors from the distortion classifier to be used by the generator (i.e., decoder) of the autoencoder.

As explained in the foregoing discussion, this disclosure utilizes a variety of terms to describe the features and advantages of one or more implementations described. For example, as used herein, the terms "digital image" (or simply "image") refers to one or more digital graphics files that when rendered displays one or more pixels. In many cases, an image includes at least one face, while in some implementations, an image includes one or more objects. Additionally, an image includes an image background, which includes the non-face pixels (or non-object pixels) of an image including a face (or an object). In addition, an image may be part of a sequence of images, such as image frames in a video or part of a sequence of images captured at different times.

As used in this document, the term "re-light" refers to adjusting the light displayed in an image, often by adding a simulated light source. In some instances, re-lighting an image provides a computer-based solution that is equivalent to simulating the addition of physical light to illuminate a subject being captured by a camera.

Also, the term "machine-learning model" refers to a computer model or computer representation that can be trained (e.g., optimized) based on inputs to approximate unknown functions. For instance, a machine-learning model can include, but is not limited to, an autoencoder model, a distortion classification model, a neural network (e.g., a convolutional neural network or deep learning model), a decision tree (e.g., a gradient-boosted decision tree), a linear regression model, a logistic regression model, or a combination of these models (e.g., an image restoration machine-learning model that includes an autoencoder model (auto-encoder for short) and a distortion classification model (distortion classification for short)).

As another example, the term "neural network" refers to a machine learning model comprising interconnected artificial neurons that communicate and learn to approximate complex functions, generating outputs based on multiple inputs provided to the model. For instance, a neural network includes an algorithm (or set of algorithms) that employs deep learning techniques and utilizes training data to adjust the parameters of the network and model high-level abstractions in data. Various types of neural networks exist, such as convolutional neural networks (CNNs), residual learning neural networks, recurrent neural networks (RNNs), generative neural networks, generative adversarial neural networks (GANs), and single-shot detection (SSD) networks.

As another example, the terms "synthetic images" or "generated images" refer to images produced by a system or model. For example, the image restoration system creates synthetic images to train an image restoration machine-learning model. In some cases, synthesized images from some or all of a training image dataset.

As used herein, the terms "object mask," "segmentation mask," or "image mask" (or simply "mask") refer to an indication of a plurality of pixels within an image. In particular, the image restoration system utilizes an image mask to isolate the pixels in a segmented area from other pixels in an image (e.g., segment a face from a background). An image mask can be square, circular, or another enclosed shape.

Figure 1B:
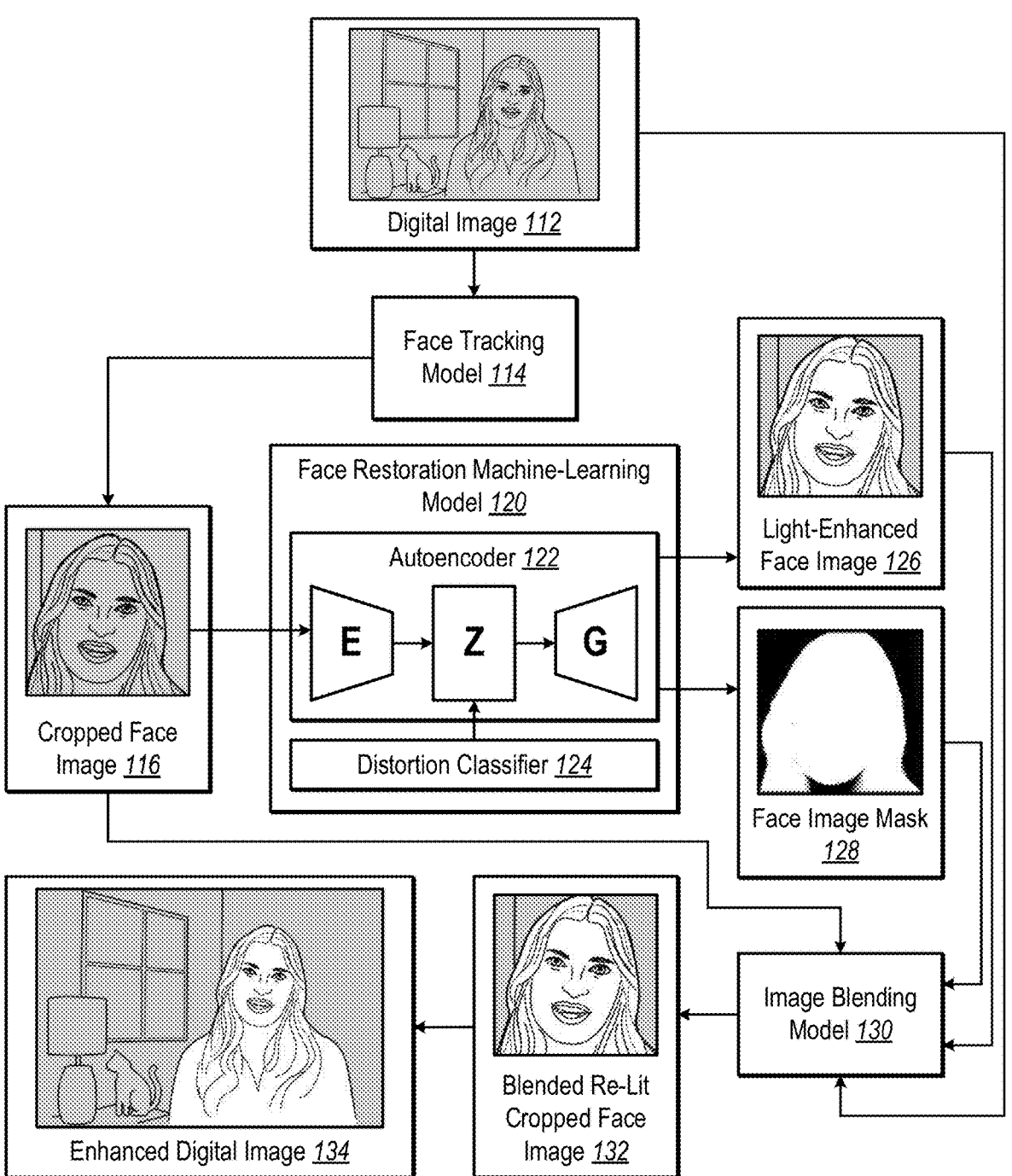

Additional details in connection with an example implementation of the image restoration system are discussed in connection with the following figures. For example, FIGS. 1A-1B illustrate example flow diagrams that provide an overview for implementing an image restoration system to restore and improve image quality in accordance with one or more implementations. In particular, FIG. 1A includes a series of acts 100 where the image restoration system enhances a user's face during a video call by utilizing a face restoration machine-learning model. FIG. 1B shows the overall process for generating an enhanced digital image from a digital image using the face restoration machine-learning model and other components.

To illustrate, in FIG. 1A, the series of acts 100 includes an act 102 of capturing a user's face from a digital image during a video where the face is poorly lit. For example, the image restoration system detects, captures, and tracks a user's face within one or more video frames or another image. As shown, the image is often poorly lit, resulting in the image having low-quality characteristics, such as noise, blurriness, and distortions. As mentioned, the image restoration system can similarly perform the series of acts 100 with respect to a target object rather than a face.

As illustrated, the series of acts 100 includes an act 104 of using a face restoration machine-learning model to generate a light-enhanced face image that re-lights and refines the face. For example, the image restoration system utilizes a face restoration machine-learning model that includes an autoencoder and a distortion classifier to generate a light-enhanced face image that shows a well-lit face from the captured image of the dimly lit face. Generating and utilizing the face restoration machine-learning model is further described below.

The series of acts 100 includes an act 106 of replacing the user's face in the digital image with the light-enhanced face image. For instance, in various implementations, the image restoration system composes the light-enhanced face image with the well-lit face with the image background of the digital image. In this way, the image restoration system selectively targets the user's face for enhancement, thereby preserving computational resources. Additional details regarding inserting the enhanced face are provided below in connection with subsequent figures.

The series of acts 100 also includes act 108 of repeating the series of acts with other digital images during the video in real time to show a well-lit face. Moreover, in most cases, the face restoration machine-learning model is employed by the image restoration system to enhance several images or video frames from a video stream in real time. The architecture and targeted training of the face restoration machine-learning model enables the image restoration system to perform image enhancements in real-time, even on devices with limited computing resources (including an NPU), such as network processing unit-based devices.

As previously mentioned, FIG. 1B provides a general overview of how the image restoration system utilizes the face restoration machine-learning model and other components to create an improved digital image from an original digital image. In FIG. 1B, a digital image 112 is shown, which can originate from a variety of sources, such as a video stream or a captured image. The digital image is often obtained from live or real-time images, but digital images can also include stored images, such as those from video playback. For instance, in the case of a video call shared with other users, the digital image 112 would be a video frame.

As shown, the digital image 112 includes the face of a user and an image background. Often, the digital image 112, particularly the user's face, is poorly lit due to poor lighting surrounding the user (e.g., insufficient lighting, poor lighting placement, colored light reflection off the user's face from a device's screen). In some implementations, the hardware of the camera device capturing the user may be inadequate to capture high-quality images of the user in poor lighting environments.

In some implementations, the digital image 112 displays the faces of multiple users. For example, multiple users may be participating in a video call from the same location and may be included in the same image. In various implementations, the digital image 112 shows an object (e.g., a target object) instead of, or in addition to, a user's face.

As shown, FIG. 1B includes a face tracking model 114. For example, the face tracking model 114 identifies the presence of a face (e.g., the user's face) in the digital image 112, detects the location of the face within the digital image 112, tracks the face, and/or crops the user's face. In some implementations, the face tracking model 114 is a machine-learning model and/or a neural network.

In various implementations, the face tracking model 114 crops the detected face to generate a cropped face image 116 of the user's face and the image background around the face. In alternative implementations, the face tracking model 114 does not crop the user's face. In some instances, the face tracking model 114 determines that the user's face does not need to be cropped (e.g., the user's face takes up the majority of the image).

In one or more implementations, the face tracking model 114 detects and tracks a user's face. For example, the face tracking model 114 tracks the face between a series of images (e.g., between successive video frames). Face tracking can include vertical and horizontal movements as well as movements toward or away from the camera. In some instances, the face tracking model 114 also tracks when a user turns their face or when a face disappears from one image and reappears in a later image.

Additionally, the face tracking model 114 can detect and track multiple faces within images. For example, if the digital image 112 includes two faces, the face tracking model 114 individually tracks each of the two faces and generates cropped face images of each face. Similarly, the image restoration system can use an object tracking model to track and capture target objects instead of, or in addition to, capturing faces.

By utilizing the face tracking model 114, the image restoration system increases overall efficiency. For example, utilizing an image restoration machine-learning model on a smaller, targeted image requires less computer processing. Further, tracking allows for more efficient processing between frames and allows for light-enhanced images to smoothly transition between frames rather than appearing jumpy and glitchy.

In some implementations, the image restoration system tracks a user's body in connection with their face to enhance the lighting of the entire user, rather than just their face. To achieve this, the image restoration system uses an additional tracking model and/or a background segmentation model that generates a cropped image of the user's body. In some implementations, the image restoration system utilizes the scale factor generated for the light-enhanced face image to generate the body-enhanced image. Additionally, the image restoration system can enhance the user's body and face separately and intelligently combine both to generate a composite image.

FIG. 1B shows how the image restoration system works. The system takes the cropped face image 116 and provides it to the face restoration machine-learning model 120, which includes an autoencoder 122 and a distortion classifier 124. The model generates a light-enhanced face image 126 and a face image mask 128 that separates the light-enhanced face from the image background within the light-enhanced face image 126 (or cropped face image 116). Additional details regarding the face restoration machine-learning model 120 are available in FIGS. 3A-3C.

FIG. 1B also includes an image blending model 130. For example, the image restoration system utilizes the image blending model 130 to blend the light-enhanced face image 126 with the background in the cropped face image 116 (or some or all of the image background of the digital image 112) to generate a re-lit cropped face image 132. For example, the image blending model 130 utilizes the face image mask 128 to separate the re-lit face portion from the background portion on the light-enhanced face image 126 and/or the cropped face image 116 before combining the re-lit face with the image background. In various implementations, the image blending model 130 uses alpha blending or other blending techniques to make the re-lit face look natural with the image background.

As shown, the image restoration system generates an enhanced digital image 134 from the digital image 112 and the re-lit cropped face image 132. For example, the image restoration system replaces the portion corresponding to the user's face (and surrounding area) with the re-lit cropped face image 132. In some implementations, the image restoration system generates the enhanced digital image 134 directly from the digital image 112 by using the light-enhanced face image 126, the face image mask 128, and the image blending model 130 to directly generate the enhanced digital image 134 from the digital image 112 rather than indirectly generating the re-lit cropped face image 132.

As mentioned above, in various instances, the image restoration system re-lights both the user's face and body. For example, the image restoration system uses the face restoration machine-learning model 120 or another image restoration machine-learning model to generate an enhanced image of the user's body, along with a corresponding body or person image mask. Additionally, the image restoration system utilizes the image blending model 130 to blend the user's body with the image background of the digital image 112 (or a cropped portion) to produce a modified digital image. The image blending model 130 is then used to blend the light-enhanced face image 126 with the modified digital image to directly or indirectly generate the enhanced digital image 134.

Figure 2A:
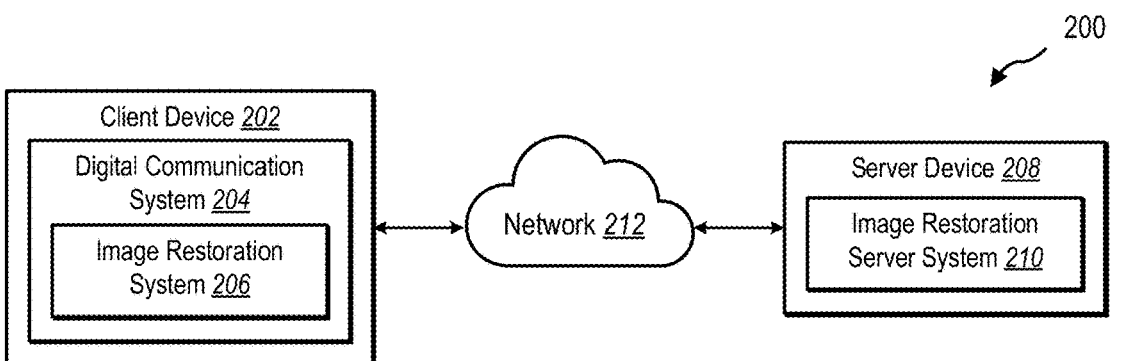
FIGS. 2A-2B illustrate an example computing environment where an image restoration system is implemented in accordance with one or more implementations.
Figure 2B:
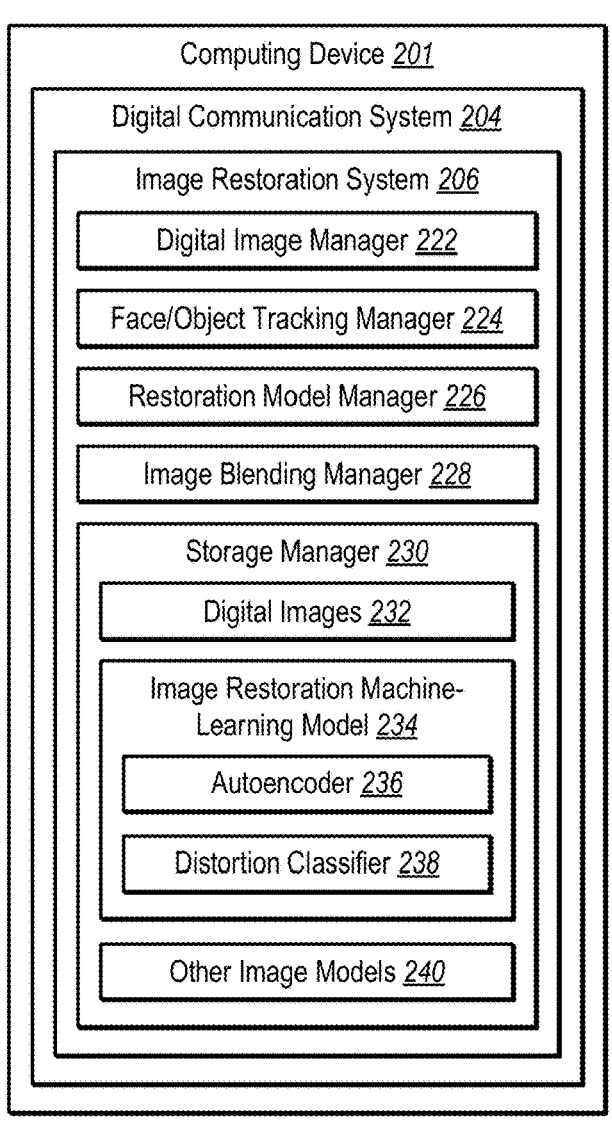

With a general overview of the image restoration system in place, additional details are provided regarding the components and elements of the image restoration system. To illustrate, FIGS. 2A-2B provide an example computing environment and architecture diagram of the image restoration system. In particular, FIGS. 2A-2B illustrate an example computing environment where an image restoration system is implemented in accordance with one or more implementations.

To illustrate, FIG. 2A shows a computing environment 200 that includes a client device 202 and a server device 208, which are each connected by a network 212. The client device 202 includes a digital communication system 204 and an image restoration system 206. The server device 208 includes an image re-lighting server system 210. Additional details regarding these and other computing devices are provided below in connection with FIG. 8. In addition, FIG. 8 also provides additional details regarding networks, such as the network 212 shown.

While FIG. 2A illustrates example arrangements and configurations of the computing environment 200, other arrangements and configurations are possible. For example, the computing environment 200 includes additional client devices communicating with each other. As another example, the image restoration system 206 is located wholly on the server device 208, which facilitates video calls between client devices.

As mentioned, the client device 202 in FIG. 2A includes the digital communication system 204. In various implementations, the digital communication system 204 manages digital image communications between computing devices. For example, the digital communication system 204 facilitates video calls or other video streams between computing devices. In some implementations, the digital communication system 204 manages capturing, storing, and/or accessing digital images, which can include a user's face and/or a target object.

As shown, the digital communication system 204 includes the image restoration system 206. In some implementations, the image restoration system 206 is located outside of the digital communication system 204 (e.g., either on the client device 202 or on another device). In general, the image restoration system 206 accurately and efficiently generates high-quality, well-lit images from low-quality, poorly lit images across a variety of conditions utilizing an image restoration machine-learning model. In addition to selectively re-lighting images, the image restoration system 206 restores and recaptures users' faces (or other objects) from noise and distortion caused by poor lighting environments and/or poorly functioning cameras. Additional details regarding the image restoration system 206 are provided in connection with FIG. 2B as well as in subsequent figures.

In addition, the computing environment 200 includes the server device 208 having the image re-lighting server system 210. In various implementations, the image re-lighting server system 210 provides a version of the image restoration system 206 to the client device 202. In some implementations, the image re-lighting server system 210 receives a video feed from the client device 202, generates a light-enhanced video feed (e.g., a set of images), and provides the light-enhanced video feed to the computing devices of other participants and/or the client device 202. In some implementations, the image re-lighting server system 210 trains and updates an image restoration machine-learning model (e.g., a face restoration machine-learning model) offline and provides it to the client device 202 such that the image restoration system 206 can apply the image restoration machine-learning model.

FIG. 2B shows the image restoration system 206 within the digital communication system 204 on a computing device 201. The computing device 201 may serve as the client device 202, the server device 208, or another computing device. As shown in FIG. 2B, the image restoration system 206 includes various components and elements, which are implemented in hardware and/or software. For example, the image restoration system 206 includes a digital image manager 222, a face/object tracking manager 224, an image restoration model manager 226, an image blending manager 228, and a storage manager 230, which includes digital images 232, an image restoration machine-learning model 234 having an autoencoder 236 and a distortion classifier 238, and other image models 240.

In general, the digital image manager 222 manages capturing, storing, accessing, and otherwise managing the digital images 232. In various instances, the face/object tracking manager 224 detects faces or objects in the digital images 232 as well as generates cropped images. In some instances, the face/object tracking manager 224 utilizes one of the other image models 240, such as a face/object tracking model, to track faces or objects between a series of images.

In many implementations, the image restoration model manager 226 generates, trains, and utilizes the image restoration machine-learning model 234. In certain implementations, the image restoration model manager 226 also uses one of the other image models, such as a facial feature extraction model, where the output is provided to the distortion classifier 238. Further, in many implementations, the output of the distortion classifier 238 is combined mid-way into the autoencoder 236, as further described below. In some implementations, the image restoration model manager 226 generates an avatar from a user's face.

Additionally, in various implementations, the image blending manager 228 blends light-enhanced images from the image restoration machine-learning model 234 with corresponding digital images to generate enhanced images where a user's face is clear and well-lit. In these implementations, the image blending manager 228 also uses corresponding segmentation masks also generated by the image restoration machine-learning model 234 to generate the enhanced images. In some instances, the image restoration system 206 uses one of the other image models, such as an image blending model.

Figure 3A:
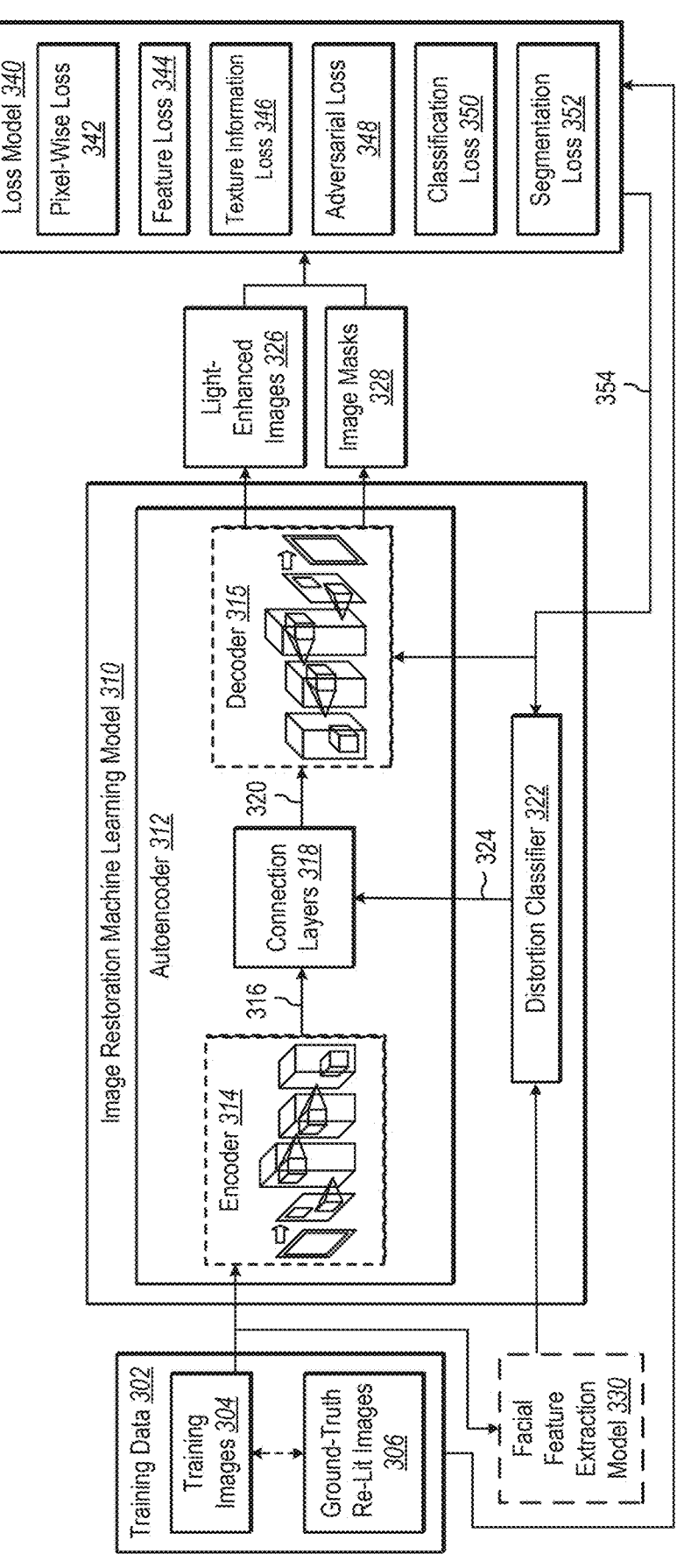
FIGS. 3A-3C illustrate example block diagrams for training and utilizing the image restoration machine-learning model in accordance with one or more implementations.
Figure 3B:
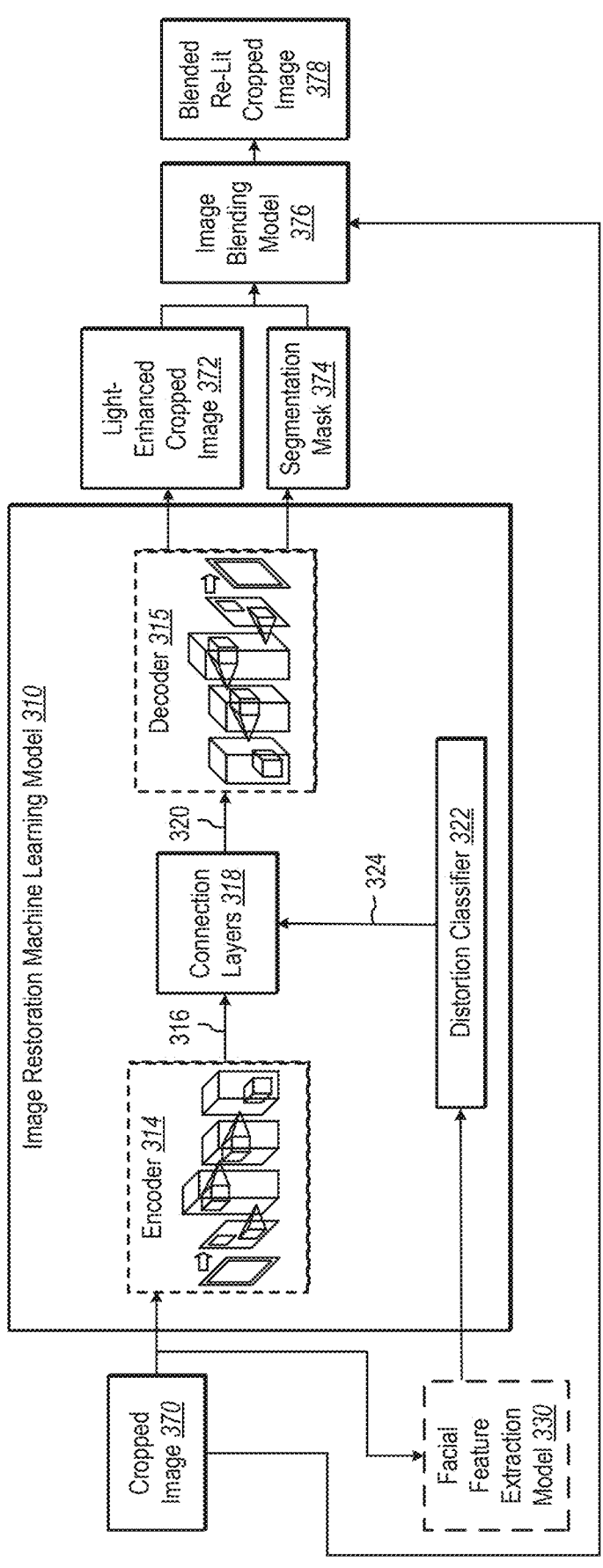
Figure 3C:
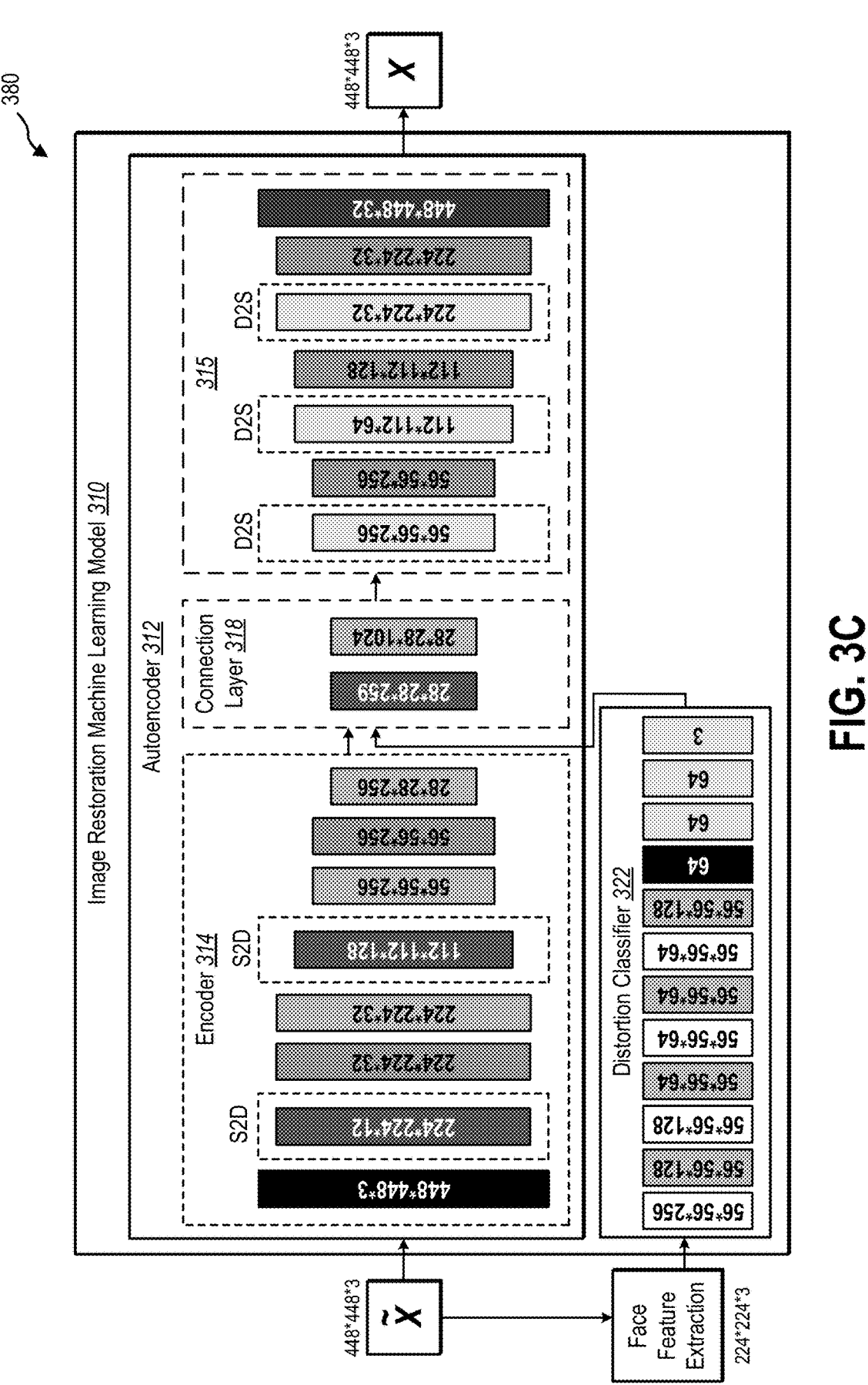

FIGS. 3A-3C illustrate example block diagrams for training and utilizing the image restoration machine-learning model in accordance with one or more implementations. Specifically, FIG. 3A shows an example of training an image restoration machine-learning model while FIG. 3B depicts using a trained image restoration machine-learning model.

FIG. 3C provides an example architecture of an image restoration machine-learning model.

As depicted, FIG. 3A includes training data 302, an image restoration machine-learning model 310, and a loss model 340. Additionally, FIG. 3A includes a facial feature extraction model 330, which may be present when the image restoration machine-learning model 310 is a face restoration machine-learning model. In cases where the image restoration machine-learning model 310 is an object restoration machine-learning model, an object feature extraction model can be added when advantageous. In some implementations, the image restoration machine-learning model 310 involves a GAN and/or a U-Net.

As shown, the training data 302 includes training images 304 and ground truth re-lit images 306. The training data 302 may include images of faces or objects in varying lighting environments, along with corresponding ground truth images of the faces in well-lit environments. In some instances, the training data 302 includes real and/or synthetic images. Further details on generating synthetic images for training data or creating training data from real images are provided below in connection with FIGS. 5A-5B.

As shown, the image restoration machine-learning model 310 includes an autoencoder 312 and a distortion classifier 322. The autoencoder 312 includes an encoder 314, a decoder 315, and connected layers 318. In many instances, the decoder 315 acts as a generator that generates images by reconstructing feature vectors of processed input images to generate images.

The image restoration machine-learning model 310 is designed as a hybrid model that utilizes depth-to-space layers and dense layers to handle various distortions more effectively. The model architecture of the image restoration machine-learning model 310 includes space-to-depth followed by CNN layers on the encoder 314 and depth-to-space followed by dense layers on the decoder 315. Both depth-to-space and depth-to-space operations ensure lossless spatial dimensionality when reducing or expanding/increasing data during processing. In contrast, existing systems use classical down-sampling and up-sampling layers such as bilinear and nearest neighbor, resulting in information losses. The image restoration machine-learning model 310 strikes a balance between high accuracy and low computational cost and runs significantly faster than existing models. More information on depth-to-space and depth-to-space operations is provided below in connection with FIG. 4A.

The image restoration system 206 utilizes the training data 302, including the training images 304, to provide input to both the autoencoder 312 and the distortion classifier 322 through the encoder 314. The encoder 314 processes the training data 302 and generates encoded feature vectors 316 (e.g., latent vectors), which are sent to the connected layers 318. At the same time, the distortion classifier 322 processes the training data 302 to produce distortion classifications 324 (e.g., distortion class priors), which are also provided to the connected layers 318. The encoded feature vectors 316 and the distortion classifications 324 are concatenated at the connected layers 318, resulting in an improved input to the autoencoder 312.

To improve the efficiency of the distortion classifier 322, the facial feature extraction model 330 preprocesses the training data 302 by generating facial features of the face in the input image. The image restoration system 206 provides pre-trained features to the facial feature extraction model 330, and the facial feature extraction model 330 outputs extracted facial features to the distortion classifier 322 as input. This approach enables the image restoration machine-learning model 310 to generate distortion classifications 324 from extracted facial features instead of relying solely on the input image.

As previously mentioned, the encoded feature vectors 316 are concatenated or supplemented with the distortion classifications 324 at the connected layers 318. The connected layers 318 then provide the modified encoder output 320 to the decoder 315, which generates light-enhanced images 326. Additionally, in various instances, the decoder 315 produces corresponding instances of the segmentation masks 328 for the light-enhanced images 326. Further, in some implementations, the decoder 315 generates an avatar of a user's face, where the avatar is based on the light-enhanced version of the user's face. The loss model 340 receives the light-enhanced images 326 and/or the segmentation masks 328 for training purposes.

Many existing systems only use facial and GAN priors (e.g., pre-trained face GAN features generated), which can lead to artifacts and unrealistic faces and face textures. The image restoration system 206 addresses this issue by incorporating a classifier, such as the distortion classifier 322, to learn and signal to the autoencoder 312 about the distortion types applied to each input image. The distortion classifications 324 for input images are integrated into the autoencoder 312 and applied to the encoder 314 when generating the light-enhanced images 326. Thus, the image restoration machine-learning model 310 integrates the distortion classifier 322, which predicts degradation types in input images and provides this class information (i.e., the distortion classifications 324) as a prior in the autoencoder 312.

Regarding the distortion classifier 322, as mentioned above, the image restoration system 206 improves upon existing systems by incorporating distortion classifications from the distortion classifier 322 into the autoencoder 312. The distortion classifier 322 is trained to recognize various types of distortion, including noise, blur, jitter, exposure, low light levels, light hues, color, chromatic, and image resizing. It can also detect and signal distortion from screen illumination, such as white or colored light reflecting off a user's face.

By utilizing the distortion class priors, the image restoration system 206 generates and provides distortion classifications 324 to preserve the face texture and user identity (e.g., preserving the identity of the person without adding any artifact to the face or changing the texture of the face). In some implementations, the distortion classifier 322 is a light CNN-based classifier that learns the distortion types applied to each image. The image restoration system 206 combines these distortion types into the encoder features of the autoencoder 312 to generate more accurate versions of the light-enhanced images 326.

In many cases, such as when training the image restoration machine-learning model 310, the image restoration system 206 utilizes a degradation model. In general, the degradation model generates low-light and/or distorted images on the fly for training. For example, the degradation model synthetically and/or randomly applies multi-degradation techniques to high-quality (HQ) images during the training and so that the image restoration machine-learning model 310 learns to recover the degraded low-quality (LQ) images as close as possible to the corresponding HQ images. In various implementations, the degradation model uses smoother but more diverse types of distortion to train the image restoration machine-learning model 310.

In various implementations, the degradation model is a full refiner model that integrates down-sampling, blur, exposure/light changes, illumination (color distortion), chromatic degradation, gaussian noise, and JPEG compression in the autoencoder 312. To illustrate, in some implementations, degradation model follows the formulation:

$$LQ = \left[ \left( \left( (HQ) \downarrow_r *_e \eta_j \ C_\gamma \right) + N_\delta \right) \otimes k_\sigma \right]_{JPEG_q}$$

In this formulation, $\downarrow$, $*$, $\eta$, C, N, k, and JPEG represent down-sampling, exposure, color jitter (e.g., brightness, contrast, saturation, hue), chromatic, noise, blur, and JPEG compression, respectively. Additionally, in various implementations, the image restoration system 206 randomly samples r, e, $\gamma$, $\delta$, $\sigma$, and q.

Algorithm 1, provided below, shows example steps of the degradation model used by the image restoration system 206.

---

Algorithm 1 - Degradation Algorithm

---

Data: HQ, Percent$_{dist}$, r, e, $\gamma$, $\delta$, $\sigma$, q
Result: LQ, Label
Percent$_{accum}$ ← 0;
Count$_{dist}$ ← 0;
N ← len(HQ);
LQ ← Ø;
Label ← Ø;
for X ∈ HQ do
   L ← {0, 0, 0};
   Percent$_{accum}$ ← Count$_{dist}$/N;
   if Percent$_{accum}$ ≤Percent$_{dist}$ then
      Y, is downscale ← DownScale(X, r);
      Y, is exposure ← RGBExposure(Y, e);
      Y, is jitter ← ColorJitter(Y,j);
      Y, is chromatic ← Chromatic(Y, $\gamma$);
      Y, is noisy ← Y + Noise(Y, $\delta$);
      Y, is blurry ← Y⊘Blur(Y, $\delta$);
      Y, is jpeg ← JPEG(Y, q);
      Count$_{dist}$ ← Count$_{dist}$ + 1;
      if is noisy or is a jpeg or is chromatic
        then
           L{0} ← 1;
      end
      if is blurry or is downscale then
        L{1} ← 1;
      end
      if is exposure or is jitter then
        L{2} ← 1;
      end
   else
      Y ← X;
   end
   LQ ← LQ + {Y};
   Label ← Label + {L};
end

---

Algorithm 1 illustrates the input for the image restoration system 206. It consists of a list of high-quality (HQ) images for each batch the Percent$_{dist}$ (e.g., the percentage of images that will be distorted per batch), and distortion ranges (r, e, $\gamma$, $\delta$, $\sigma$, and q) for each distortion type. For each image, the image restoration system 206 first checks whether a distortion percentage limit has been reached for that batch. If the limit is not reached, the system applies downscaling, exposure change per RGB channel, color jitter (e.g., by simulating different illuminations on a face or object), chromatic, additive white Gaussian noise, Gaussian blur convolution, and compresses the image using the JPEG operation. If the percentage of images exceeds the Percent$_{dist}$ limit, the image restoration system 206 uses the same image without any distortion as a target image. By doing so, the image restoration system 206 lets the autoencoder 312 to see both LQ and HQ images during training, adding robustness and ensuring that images are not over-enhanced, which can create unnecessary and overcompensated unnatural artifacts.

Additionally, Algorithm 1 shows that the image restoration system 206 may utilize three main classes, namely noise, blur, and exposure, to train the distortion classifier 322 to predict the types of distortion present in the image. As previously mentioned, the image restoration system 206 trains the distortion classifier 322 in parallel with the auto-encoder 312.

The degradation model is not only used to apply degradation to each HQ image but also to generate the ground truth class labels (the ground-truth re-lit images 306) for the distortion classifier based on the types of distortion present. Distortion classes generally include noise (e.g., Gaussian, JPEG, and chromatic), blur (Gaussian blur and downscale), and exposure.

As for the decoder 315, in various implementations, the decoder 315 is an image generator that processes the modified encoder output 320 (the encoder/classifier concatenated output) and applies a series of depth-to-space operations (e.g., re-ranging the data from depth (channel) to space (weight and height)) followed by dense blocks. The image restoration system 206 utilizes two-CNN layers (with channel sizes of three and one) in the decoder 315 to generate the light-enhanced images 326 and the segmentation masks 328.

Additionally, in various implementations, the image restoration system 206 preserves the identity of the person (e.g., the model does not change a person's identity). For example, the image restoration system 206 trains the model to not introduce additional artifacts that may alter the identity of the person in terms of age, gender, skin tone, makeup, or other facial features.

In some implementations, the light-enhanced images 326 and the segmentation masks 328 are of cropped faces (or a cropped object). To achieve this, the image restoration system 206 uses facial segmentation to allow the model to focus solely on enhancing the facial region while predicting the face boundary.

With respect to training, the loss model 340 compares the light-enhanced images 326 and/or the segmentation masks 328 generated by the image restoration machine-learning model 310 to the ground-truth re-lit images 306, corresponding to training images 304 provided to the image restoration machine-learning model 310 to determine the amount of loss or error. In some implementations, the loss model 340 discards background information (e.g., using the segmentation masks 328) and focuses solely on enhancing the face area of the light-enhanced images 326 while also improving how to segment the face area.

To determine a loss amount, the loss model 340 may use one or more loss functions. The loss amount is provided back to the image restoration machine-learning model 310 as feedback 354 to tune the weights, parameters, layers, and/or nodes of the model. The loss functions or types include pixel-wise loss 342, feature loss 344, texture information loss 346, adversarial loss 348, classification loss 350, and segmentation loss 352. Furthermore, the image restoration system 206 trains the distortion classifier 322 in parallel with the autoencoder 312 to better train the decoder 315 on how to remove specific types of real-world distortions. The image restoration machine-learning model 310 is trained via backpropagation in an end-to-end manner until the model converges or satisfies another training criterion.

The image restoration system 206 utilizes various loss functions. For instance, the pixel-wise loss 342 is a type of reconstruction loss that measures the error amount of the distance between the light-enhanced images 326 (i.e., predicted images) and the ground-truth re-lit images 306. The feature loss 344 is a type of perceptual loss that measures the error amount of the high-level feature maps of a facial feature extraction network between predicted images and ground truth images. The texture information loss 346 refers to a type of style loss that measures the error amount of the distance between matrices of the representations of predicted images and the ground truth images.

Additionally, the adversarial loss 348 represents a type of adversarial loss that measures the error amount of loss from the generator (e.g., decoder 315) of the GAN model. The classification loss 350 measures the error amount in terms of cross-entropy loss for the distortion classifier 322, which predicts the types of distortions applied to the image. The segmentation loss 352 represents a type of dice loss that measures the error amount of the overlap between predicted masks and ground truth masks. The image restoration system 206 may also use color enhancement loss in some implementations.

In various implementations, the image restoration system 206 trains the image restoration machine-learning model 310 to be computationally efficient. For example, the image restoration system 206 incorporates synthetic distortions that simulate real-world distortions into the training data 302 and uses less severe degradation scales than existing systems, which require fewer computations to achieve more accurate results. Additionally, the image restoration system 206 utilizes a reduced parameter set compared to the existing systems, allowing the image restoration system 206 to operate in real-time across various computing devices (e.g., inferring 80-100 frames per second on a low-power neural processing unit (NPU)).

Once the image restoration machine-learning model 310 has been trained, it enables the image restoration system 206 to achieve a variety of objectives. For instance, it enhances faces that are noisy, blurry, or of low quality, while also restoring faces under different lighting and exposure conditions. In some cases, the image restoration machine-learning model 310 generates a segmentation of the facial region, which can be useful for post-production purposes, such as real-time video editing and streaming. In several implementations, instead of blending the light-enhanced face or person with the original image background, the image restoration system 206 combines the light-enhanced face or person with a distinct background. Thus, the image restoration system 206 eliminates the need for a greenscreen-type background and can also function in real time.

To illustrate the functioning of the image restoration system 206 using a trained image restoration machine-learning model for inferencing input images into enhanced re-lit images, FIG. 3B provides a visual representation. Specifically, the figure depicts the image restoration system 206 providing a cropped image 370 to the image restoration machine-learning model 310, which is a face restoration machine-learning model in this case. The image restoration machine-learning model 310 uses the autoencoder 312 combined with a distortion classification of the distortion classifier 322 to generate a light-enhanced cropped image 372 and a corresponding image mask 374. Furthermore, the image restoration system 206 utilizes an image blending model 376 to generate a blended re-lit cropped image 378, which is used to create the enhanced image, as described previously.

In various implementations, the encoder 314 of the autoencoder 312 receives the output from the degradation model (LQ images) and goes through several shuffling layers (space-to-depth) followed by dense blocks. Space-to-depth layers rearrange the data from space (weight and height) to depth (channel), allowing for a lossless spatial dimensionality increase. As mentioned earlier, space-to-depth layers are computationally efficient.

In some implementations, the distortion classifier 322 predicts the degradation types present in the input. This additional information is used by the image restoration system 206 to help the decoder 315 recover and enhance an image. Therefore, in various implementations, the image restoration system 206 first extracts the LQ image features from the facial feature extraction model 330, as described earlier, and passes them to the distortion classifier 322 with one or more labels generated by the degradation model. Additionally, the output of the distortion classifier 322 (i.e., the distortion classifications 324) is concatenated with the final output of the encoder (i.e., the encoded feature vectors 316).

FIG. 3C illustrates an example architecture 380 of the image restoration machine-learning model 310. Notably, the autoencoder 312 includes various space-to-depth layers (shown as S2D) in the encoder 314, while the decoder 315 includes depth-to-space layers (shown as D2S). In addition, the autoencoder 312 comprises various other layers, including an input layer that receives a cropped image (e.g., $X^-$), dense layers, convolutional layers, batch normalization (BN) layers, rectified linear activation function (ReLU) layers, pooling layers, and concatenation layers (e.g., in the connected layers 318). The distortion classifier 322 also includes convolutional layers, BN layers, ReLU layers, pooling layers, dense layers, and/or another neural network layer.

Figure 4A:
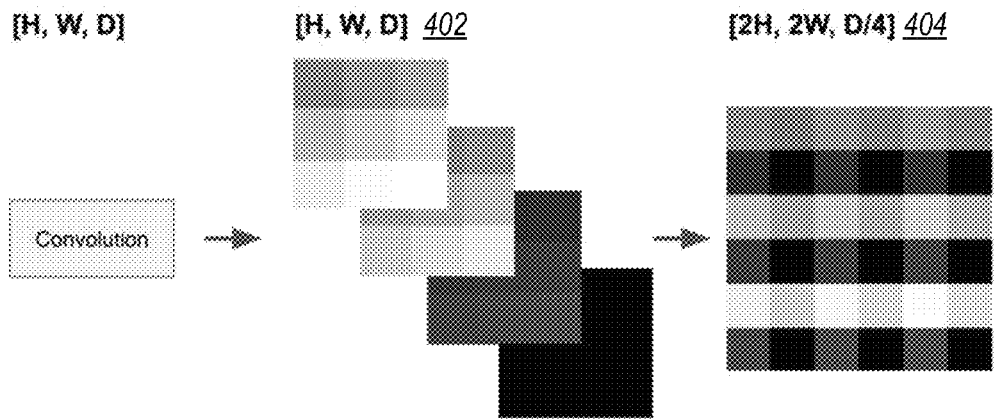
FIGS. 4A-4B illustrate example block diagrams showing additional details of the image restoration machine-learning model in accordance with one or more implementations.
Figure 4B:
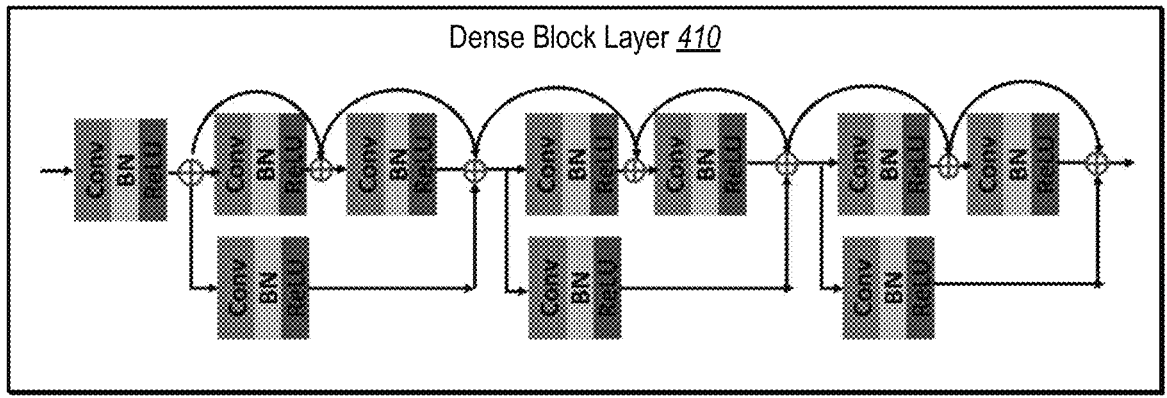

FIGS. 4A-4B illustrate example block diagrams showing additional details of the image restoration machine-learning model in one or more implementations. FIG. 4A corresponds to depth-to-space layers. The space-to-depth layer in the encoder re-arranges data from a depth (channel) to a space (weight and height), while maintaining lossless spatial dimensionality during data reduction. The depth-to-space layers in the decoder perform the opposite function (re-arranging data from space to depth).

In FIG. 4A, a visual examples of a depth-to-space layer that re-arranges data from depth to space is shown. The example includes depth 402 and space 404. In various implementations, the depth-to-space layer performs an operation that outputs a copy of the input tensor, moving values from the depth dimension in spatial blocks to the height and width dimensions.

FIG. 4B shows an example of a dense block layer 410 (e.g., a dense block module) within the autoencoder 312. The dense block layer 410 comprises convolutional (conv) layers, batch normalization (BN) layers, rectified linear activation function (ReLU) layers, and several residual connections. Dense block layer 410 typically follows the space-to-depth layers in the encoder 314 and the depth-to-space layers in the decoder 315. In various implementations, each dense block layer 410 extracts rich local features via dense residual connections.

Figure 5A:
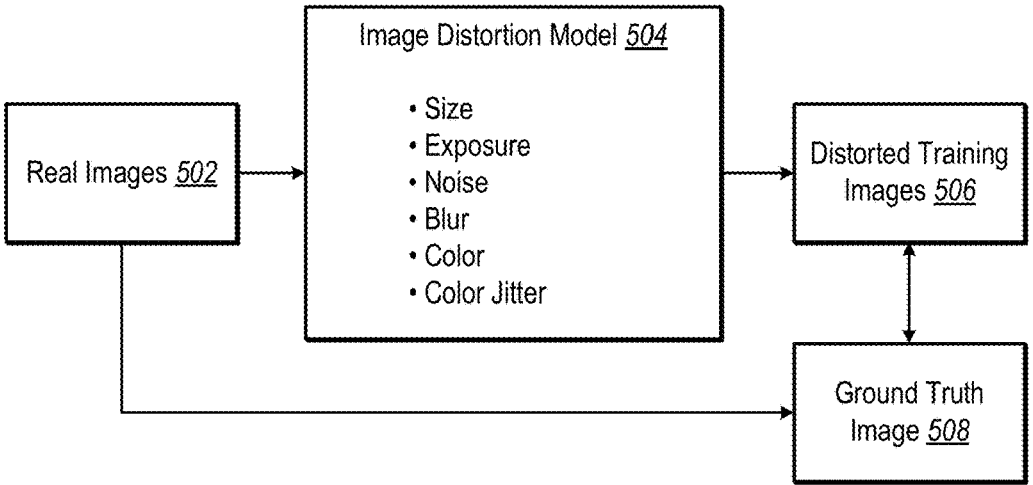
FIGS. 5A-5B illustrate an example process flow for generating real and synthetic data for training an image restoration machine-learning model in accordance with one or more implementations.
Figure 5B:
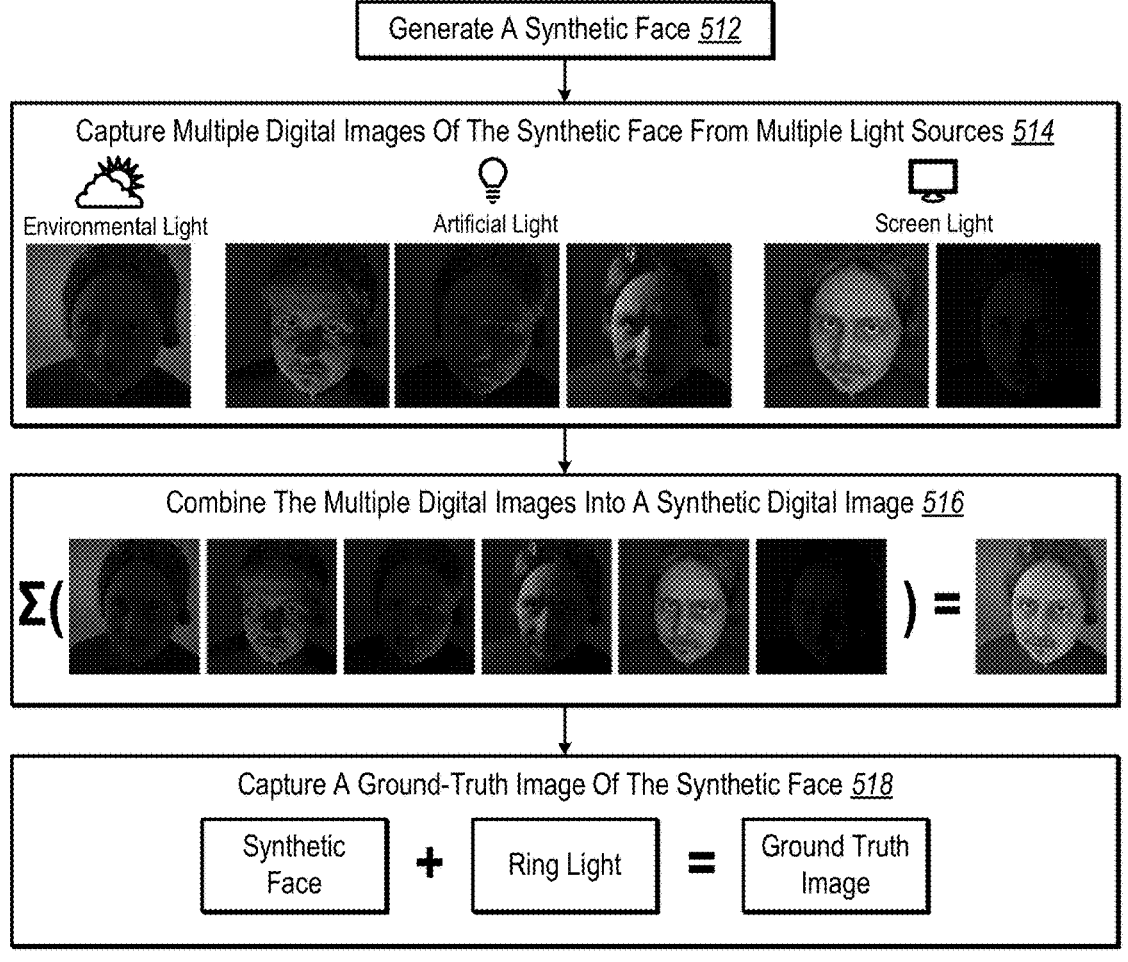

Turning to the next figures, FIGS. 5A-5B illustrate an example process flow for generating real and synthetic data to train an image restoration machine-learning model in one or more implementations. FIG. 5A depicts the process of generating training data from real images, while FIG. 5B shows the process of generating training data from synthetic images.

As previously mentioned, the image restoration system 206 generates training data to ensure that the image restoration machine-learning model 310 is trained to enhance low-quality images in real-world conditions without making the training too broad, which would hinder the model's ability to handle non-real-world conditions that it is unlikely to encounter. By doing so, the image restoration system 206 keeps the model light, small, and efficient.

FIG. 5A displays how the image restoration system 206 starts with real images 502 and applies various image distortions to generate distorted training images 506. The image restoration system 206 also generates ground truth images 508 from real images 502. In many instances, a ground truth image is the original input image.

The image distortion model 504, which includes various types of distortion functions (e.g., based on size, exposure, noise, blur, color, and color jitter), distorts the real images 502 into the distorted training images 506. The image restoration system 206 can utilize additional or alternative types of distortion functions.

In some implementations, the image restoration system 206 applies colored illumination to real images 502 with varying degrees of brightness, contrast, saturation, and hue. This approach generates training data that trains the image restoration machine-learning model to detect and remove unwanted colored illumination from input images when enhancing the images through re-lighting and other processes.

In FIG. 5B, the image restoration system 206 is depicted creating synthetic images for training data. To illustrate, FIG. 5B includes an act 512 of generating a synthetic face. In various implementations, the image restoration system 206 generates a synthetic face using three-dimensional modeling or rendering software, which can be randomized with various hair styles, facial features, and accessories.

Additionally, FIG. 5B includes an act 514 of capturing multiple digital images of the synthetic face from multiple light sources. For example, the image restoration system 206 creates synthetic light sources, such as environment light, artificial light, and device screen light, which can vary in color, brightness, color temperature, bulb type, and time of day. These light sources can be positioned in any location that illuminates the subject's face.

Using a randomized selection of light sources and lighting positions, the image restoration system 206 generates a set of multiple images for a single face. In some implementations, the selection is weighted to select more of one light-source type than another light-source type. In alternative implementations, the image restoration system 206 generates one or more images that include light from multiple light sources with the same or different locations.

As shown, FIG. 5B includes an act 516 of combining the multiple images in the set into a combined synthetic image. In this way, the image restoration system 206 generates a synthetic image that mimics real-world scenarios of users. For example, once the individual light source images are rendered, the image restoration system 206 combines the multiple images in the set using weighted sums to generate numerous synthetic images having multi-source lighting conditions. The act 516 may also involve processing the summed images further to add effects such as noise, chromatic aberration, color, and lens distortions, as described in FIG. 5A.

As also shown, the act 518 involves capturing a ground-truth image of the synthetic face, such as direct natural light, a ring light, or another light source that a user in the real world would use to capture their face on camera. In various implementations, the image restoration system 206 associates the ground-truth image with a corresponding multi-source lit image of the same subject's face and adds it to the training data.

Throughout this document, it has been mentioned that the image restoration system 206 offers significant benefits and improvements over existing systems. For example, in FIG. 6, we can see a comparison between the image restoration system and other existing systems. In particular, FIG. 6 includes a first set of enhanced faces 602 (e.g., a woman) and a second set of enhanced faces 604 (e.g., a man), as well as the input image 606 and the ground-truth image 612 for comparison.

Figure 6:
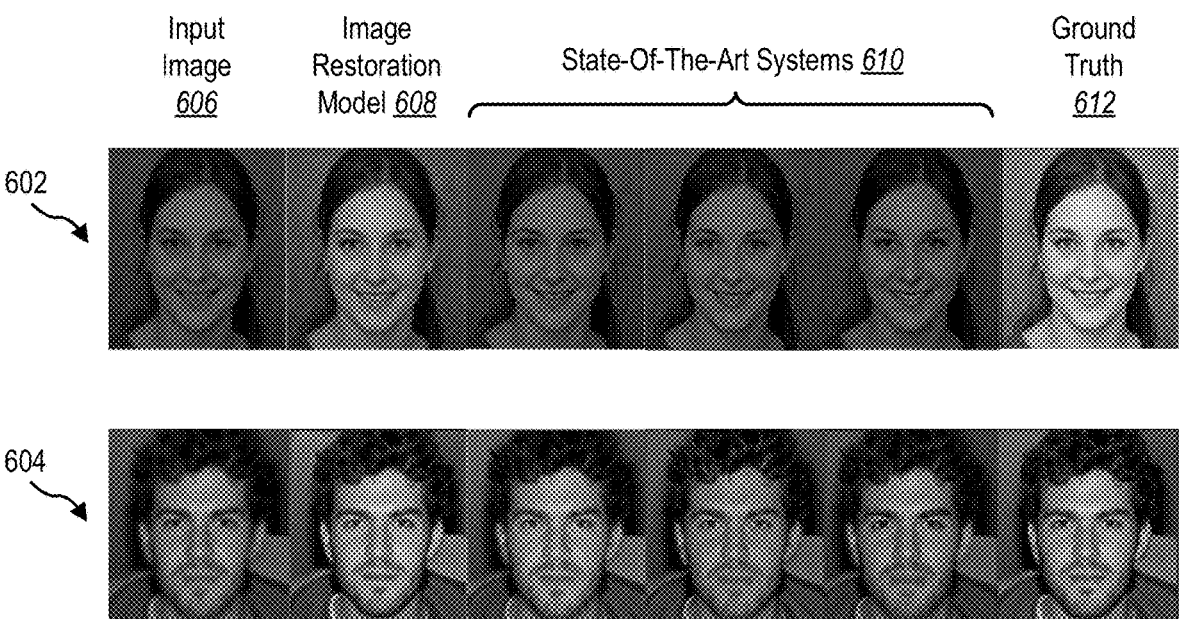
FIG. 6 illustrates example image results for comparing the image restoration system in accordance with one or more implementations with other existing systems.

As also shown, FIG. 6 shows enhanced versions of the two faces based on the image restoration system 206, referred to as the "image restoration model 608", compared to state-of-the-art systems 610. The state-of-the-art systems 610 are multi-degradation models that focus on face restoration and were released within the past 2 years. As the image restoration model 608 image shows, the image restoration system 206 improves both low-light noise and blur over the enhanced images generated by the state-of-the-art systems 610. Additionally, the image restoration system 206 generates more natural and realistic results. In other evaluations, the image restoration system 206 was found to do a better job at removing color illumination from faces.

Researchers also performed multiple performance evaluations, including Peak Signal-to-Noise Ratio (PSNR), pixel-wise metrics such as Structural Similarity (SSIM), and Learned Perceptual Image Patch Similarity (LPIPS). These evaluations revealed that the image restoration system 206 performed at the highest level of accuracy, fastest speed (2X-4X times faster than other evaluated models), and with the smallest model size (4X-20X smaller than other evaluated models).

Figure 7:
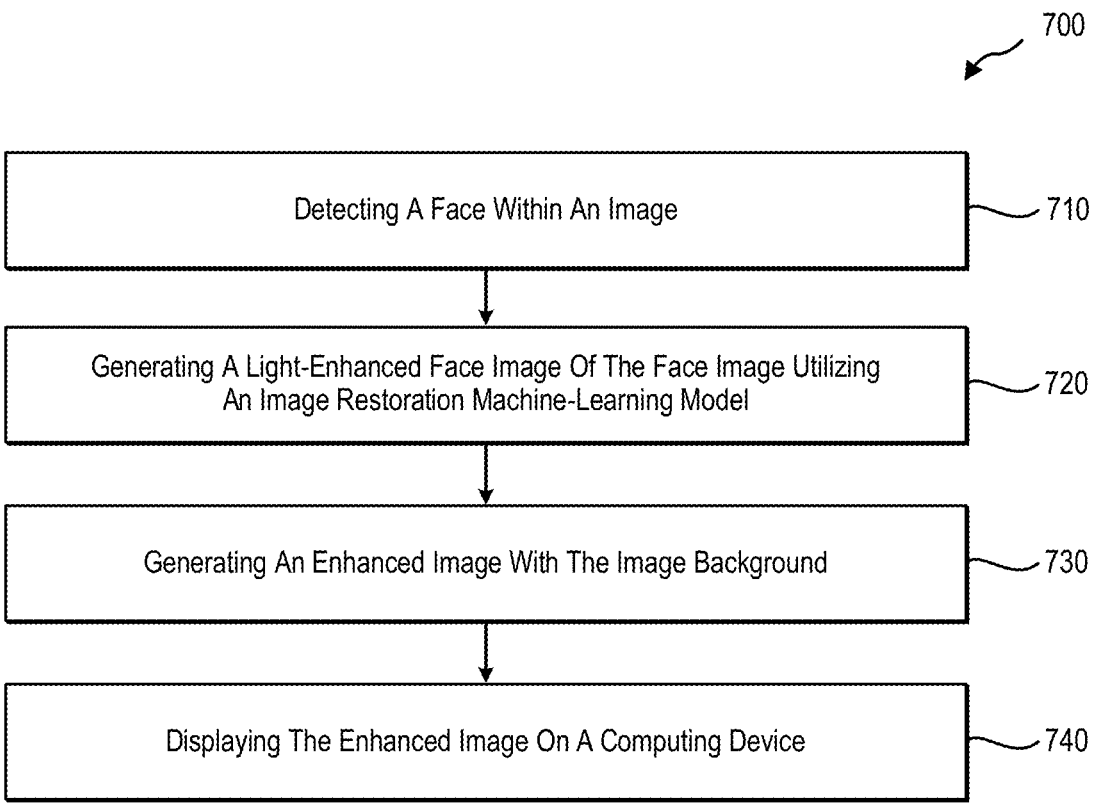
FIG. 7 illustrates an example series of acts for generating, enhancing, restoring, and re-lighting digital images in accordance with one or more implementations.

Turning now to FIG. 7, this figure depicts an example flowchart outlining a series of acts 700 for utilizing the image restoration system 206 in accordance with one or more implementations. In particular, FIG. 7 illustrates an example series of acts for generating, enhancing, restoring, and re-lighting digital images in accordance with one or more implementations.

While FIG. 7 illustrates acts according to one or more implementations, alternative implementations may omit, add to, reorder, and/or modify any of the acts shown. Further, the acts of FIG. 7 can be performed as part of a method (e.g., a computer-implemented method). Alternatively, a non-transitory computer-readable medium can include instructions that, when executed by a processing system comprising a processor, cause a computing device to perform the acts shown in FIG. 7. In still further implementations, a system (e.g., a processing system comprising a processor) can perform the acts of FIG. 7.

As shown, the series of acts 700 includes an act 710 of detecting a face within an image. For instance, in example implementations, the act 710 involves detecting a face within a digital image that includes the face and an image background. In some implementations, the act 710 includes detecting the face within the digital image by utilizing a face-tracking model to identifying the face in the digital image; cropping the face in the digital image to generate a cropped image; providing the face image to the image restoration machine-learning model (a face or object restoration machine-learning model); and/or tracking the face across a set of sequential digital images.

As further shown, the series of acts 700 includes an act 720 of generating a light-enhanced face image of the face utilizing an image restoration machine-learning model. For instance, in example implementations, the act 720 involves generating a light-enhanced face image of the face within the digital image utilizing an image restoration machine-learning model that includes an autoencoder and a distortion classifier. In one or more implementations, the act 720 includes generating a light-enhanced face image from the face image utilizing the image restoration machine-learning model by combining outputs of the distortion classifier and encoder as an input to the generator. In some implementations, the act 720 includes improving lighting on the face, restoring low-quality facial features to higher-quality facial features, reducing blur, and reducing noise.

In some implementations, the image restoration machine-learning model generates an enhanced digital image that improves lighting on the light-enhanced face image over the digital image and restores low-quality facial features to higher-quality facial features in the light-enhanced face image. In various cases, the image restoration machine-learning model rearranges data in the autoencoder to maintain lossless spatial dimensionality. For example, generating the light-enhanced face includes rearranging data in the autoencoder to maintain lossless spatial dimensionality. In some implementations, the autoencoder maintains the lossless spatial dimensionality changes utilizing space-to-depth and depth-to-space rearranging neural network layers.

In various implementations, the act 720 includes utilizing an encoder that generates feature vectors based on the face within the digital image to generate the light-enhanced face image; utilizing the distortion classifier to generate a distortion classification for the face within the image as part of generating the light-enhanced face image; and/or utilizing a generator to produce or generate the light-enhanced face image from the feature vectors and the distortion classification as part of generating the light-enhanced face image. In some implementations, the distortion classifier generates the distortion classification to indicate amounts of noise distortion, blur distortion, exposure distortion, and/or light distortion in the face detected within the digital image.

In one or more implementations, the act 720 includes generating the light-enhanced face image to have image dimensions that match image dimensions of the cropped image and/or generating a face image mask that separates non-face pixels from face pixels in the light-enhanced face image. For example, the image restoration machine-learning model generates a light-enhanced face image has matching images dimensions (e.g., the same or substantially the same) with the original face image and includes a face image mask that identifies face pixels in the light-enhanced face image. In some instances, generating the enhanced digital image includes utilizing the face image mask to blend the light-enhanced face image with the image background of the digital image. In some cases, the digital image shows a colored light shining on the face and the image restoration machine-learning model generates the light-enhanced face image to remove the colored light shown in the digital image. In some implementations, detecting the face within the digital image includes detecting a colored light shining on the face and/or generating the light-enhanced face image includes removing an effect of the colored light included in the digital image. In this way, the restoration machine-learning model enhances the illumination of a face if there is too much light on the face, or if there is a camera color imbalance, exposure, camera noise, etc.

As further shown, the series of acts 700 includes an act 730 of generating an enhanced image with the image background. For instance, in example implementations, the act 730 involves generating an enhanced digital image (having a re-lit face) by combining the light-enhanced face image with the original image background.

As further shown, the series of acts 700 includes an act 740 of displaying the enhanced image on a computing device. For instance, in example implementations, the act 740 involves providing the enhanced digital image for display on a computing device.

In some implementations, the series of acts 700 includes additional acts. For example, in certain implementations, the additional acts of segmenting a person or body portion from the digital image to generate a person or body image, the person or body portion being connected to the face; generating a modified digital image having a re-lit person or body portion by combining a person- or body-enhanced image with the image background; and generating the enhanced digital image having the re-lit face and the re-lit person or body portion by combining the light-enhanced face image with the modified digital image. In various implementations, series of acts 700 includes segmenting a body portion from the digital image to generate a body image, the body portion being connected to the face and generating a body-enhanced image utilizing the image restoration machine-learning model. In one or more implementations, generating the enhanced digital image further includes combining the body-enhanced image with the light-enhanced face image and the image background.

In some instances, the series of acts 700 also includes acts of generating the modified digital image by blending the person- or body-enhanced image with the image background utilizing a first set of blending weights and/or generating the enhanced digital image by blending the light-enhanced face image with the modified digital image utilizing a second set of blending weights. In various implementations, the first set of blending weights differs from the second set of blending weights.

In one or more implementations, the series of acts 700 includes tracking the face across a digital video having a set of digital images that includes the digital image; generating a set of face-enhanced digital images from the set of digital images utilizing the image restoration machine-learning model, where the set of face-enhanced digital images includes the enhanced digital image; and providing the set of face-enhanced digital images for display on the computing device as a face-enhanced digital video.

In various implementations, the series of acts 700 includes generating the image restoration machine-learning model by training the distortion classifier and the autoencoder in parallel to improve the accuracy of the generator, where the image restoration machine-learning model uses real digital images and synthetic digital images. In some instances, generating a synthetic digital image includes generating a synthetic face; capturing multiple digital images that each shine light from a different light source on the synthetic face; and combining the multiple digital images into a combined digital image to generate the synthetic digital image.

In some implementations, generating the image restoration machine-learning model includes utilizing loss model functions that include pixel-wise loss, feature loss, texture information loss, adversarial loss, classification loss, and/or segmentation loss.

Additionally, in one or more implementations, the series of acts 700 includes additional acts of detecting or segmenting an object from a digital image having an image background to generate an object image; generating a light-enhanced object image (from the object image) utilizing an object-re-lighting neural network that includes an autoencoder and a distortion classifier; generating an enhanced digital image having a re-lit object by combining the light-enhanced object image with the image background, where the enhanced digital image improves lighting on the object over the digital image and maintains a same image background as the digital image; and providing the enhanced digital image for display on a computing device.

Further, in some implementations, generating the light-enhanced object image includes generating a distortion classification (from the object image) utilizing the distortion classifier of the object relighting neural network; generating feature vectors of the object image utilizing an encoder network of the object-re-lighting neural network; and generating the light-enhanced object image utilizing a generator of the object-re-lighting neural network from a combination of the distortion classification and the feature vectors.

In various implementations, the series of acts 700 also includes tracking the object across a set of digital images that includes the digital image; generating a set of object-enhanced digital images from the set of digital images utilizing the object-re-lighting neural network, wherein the set of object-enhanced digital images includes the enhanced digital image; and providing the set of object-enhanced digital images for display on the computing device as an object-enhanced digital video.

In this disclosure, a "network" is defined as one or more data links that enable the transport of electronic data between computer systems, modules, and other electronic devices. A network may include public networks such as the Internet, as well as private networks. When information is transferred or provided over a network or another communications connection (either hardwired, wireless, or a combination of hardwired and wireless) to a computer, the computer views the connection as a transmission medium. Transmission media can include a network and/or data links that carry computer-executable instructions or data structures and which can be accessed by a general-purpose or special-purpose computer. The scope of computer-readable media includes combinations of the above In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the image restoration system. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
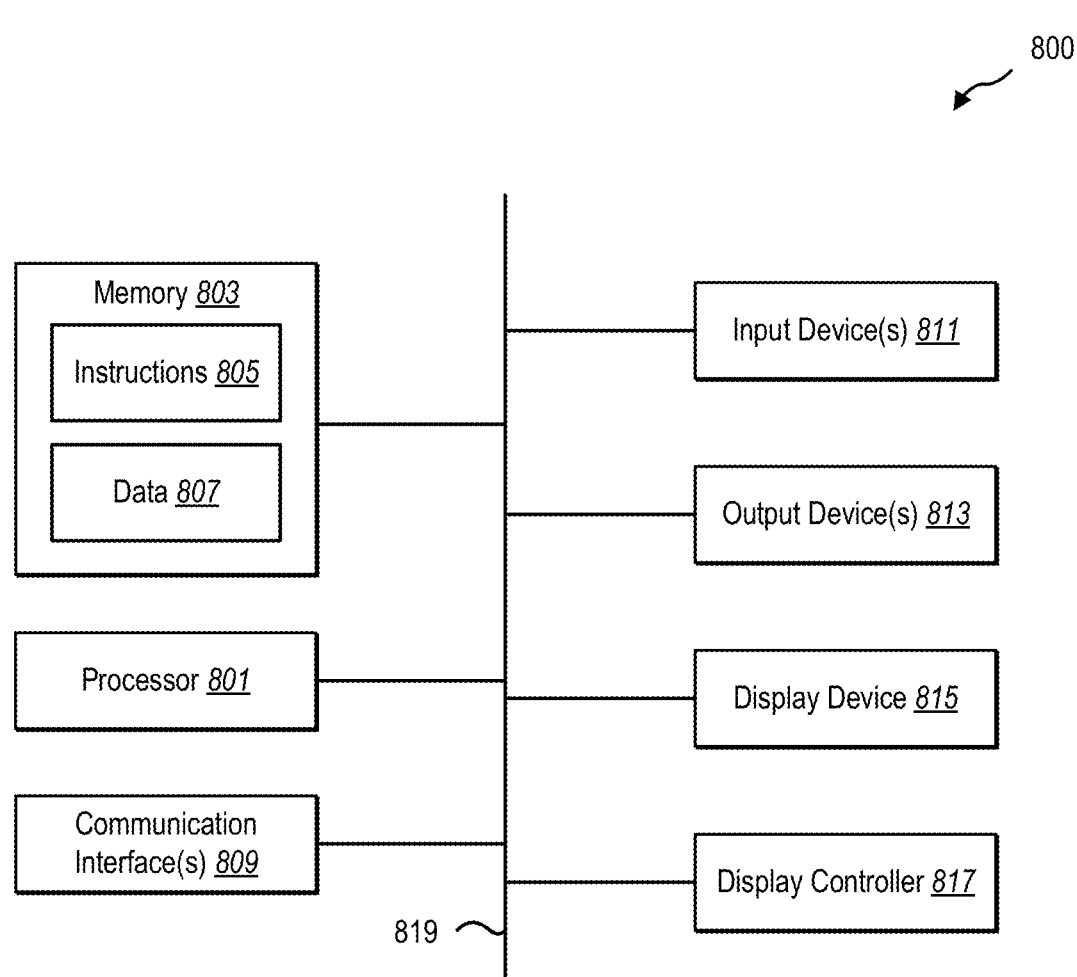
FIG. 8 illustrates example components included within a computer system.

FIG. 8 illustrates certain components that may be included within a computer system 800. The computer system 800 may be used to implement the various computing devices, components, and systems described herein. As used herein, a "computing device" refers to electronic components that perform a set of operations based on a set of programmed instructions. Computing devices include groups of electronic components, client devices, sever devices, etc.

In various implementations, the computer system 800 represents one or more of the client devices, server devices, or other computing devices described above. For example, the computer system 800 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processing system including a processor 801. The processor 801 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method comprising:
detecting a face within a digital image that includes the face and an image background;
generating a light-enhanced face image of the face utilizing an image restoration machine-learning model that includes an autoencoder model and a distortion classifier by:
producing a distortion classification by the distortion classifier; and
concatenating the distortion classification with encoded feature vectors generated by an encoder of the autoencoder model;
generating an enhanced digital image by combining the light-enhanced face image with the image background; and
providing the enhanced digital image for display on a computing device.

2. The computer-implemented method of claim 1, wherein generating the enhanced digital image includes improving lighting on the face, restoring low-quality facial features to higher-quality facial features, reducing blur, and reducing noise.

3. The computer-implemented method of claim 1, wherein generating the light-enhanced face image further comprises:
generating, using the autoencoder model, the encoded feature vectors based on the face within the digital image;
generating, using the distortion classifier, the distortion classification for the face within the digital image; and
generating, using the autoencoder model, the light-enhanced face image from the encoded feature vectors and the distortion classification.

4. The computer-implemented method of claim 3, wherein generating the distortion classification includes indicating amounts of noise distortion, blur distortion, exposure distortion, and light distortion in the face detected in the digital image.

5. The computer-implemented method of claim 1, wherein the distortion classifier is a lightweight classifier machine learning model that learns distortion types applied to images.

6. The computer-implemented method of claim 1, wherein:
detecting the face within the digital image includes:
identifying the face in the digital image;
cropping the face in the digital image to generate a cropped image; and
tracking the face across a set of sequential digital images; and
generating the light-enhanced face image includes:
generating the light-enhanced face image to have image dimensions that match the image dimensions of the cropped image; and
generating a face image mask that separates non-face pixels from face pixels in the light-enhanced face image.

7. The computer-implemented method of claim 6, wherein generating the enhanced digital image includes utilizing the face image mask to blend the light-enhanced face image with the image background of the digital image.

8. The computer-implemented method of claim 1, wherein:
detecting the face within the digital image includes detecting a colored light shining on the face; and

generating the light-enhanced face image includes removing an effect of the colored light included in the digital image.

9. The computer-implemented method of claim 1, wherein generating the light-enhanced face image includes rearranging data in the autoencoder model to maintain lossless spatial dimensionality.

10. The computer-implemented method of claim 1, further comprising:
segmenting a body portion from the digital image to generate a body image, the body portion being connected to the face;
generating a body-enhanced image utilizing the image restoration machine-learning model; and
wherein generating the enhanced digital image further comprises combining the body-enhanced image with the light-enhanced face image and the image background.

11. The computer-implemented method of claim 10, wherein generating the body-enhanced image further comprises utilizing a scale factor generated for the light-enhanced face image.

12. The computer-implemented method of claim 1, further comprising:
tracking the face across a digital video having a set of digital images that includes the digital image;
generating a set of face-enhanced digital images from the set of digital images utilizing the image restoration machine-learning model, wherein the set of face-enhanced digital images includes the enhanced digital image; and
providing the set of face-enhanced digital images for display on the computing device as a face-enhanced digital video.

13. A system comprising:
an image restoration machine-learning model that includes a distortion classifier and an autoencoder model having an encoder and a generator, wherein the distortion classifier is separate from the autoencoder model;
a processor; and
a computer memory comprising instructions that, when executed by the processor, cause the system to carry out operations comprising:
detecting a face within a digital image that includes the face and an image background;
generating a light-enhanced face image of the face utilizing the image restoration machine-learning model based on:
producing a distortion classification by the distortion classifier;
combining the distortion classification from the distortion classifier with encoded feature vectors output from the encoder of the autoencoder model to generate a combined output; and
using the combined output as an input to the generator of the autoencoder model; and
generating an enhanced digital image by combining the light-enhanced face image with the image background.

14. The system of claim 13, wherein the instructions further comprise generating the image restoration machine-learning model by training the distortion classifier and the autoencoder model in parallel to improve accuracy of the generator, wherein the image restoration machine-learning model uses both real digital images and synthetic digital images.

15. The system of claim 13, wherein the instructions further comprise generating a synthetic digital image by:
generating a synthetic face;
capturing multiple digital images that each shine light from a different light source on the synthetic face; and
combining the multiple digital images into a combined digital image to generate the synthetic digital image.

16. The system of claim 13, wherein the instructions further comprise generating the image restoration machine-learning model by utilizing loss model functions that include pixel-wise loss, feature loss, texture information loss, adversarial loss, classification loss, or segmentation loss.

17. The system of claim 13, wherein the distortion classifier predicts degradation types in the digital image and generates the distortion classification to indicate the degradation types in the digital image.

18. A computer-implemented method comprising:
detecting an object within a digital image that includes an image background;
generating a light-enhanced object image utilizing an object-re-lighting neural network that includes an autoencoder model and a distortion classifier by:
producing a distortion classification by the distortion classifier; and
concatenating the distortion classification with encoded feature vectors generated by an encoder of the autoencoder model;
generating an enhanced digital image having a re-lit object by combining the light-enhanced object image with the image background, wherein the enhanced digital image improves lighting on the object as compared to the digital image and maintains a same or substantially similar image background as the digital image; and
providing the enhanced digital image for display on a computing device.

19. The computer-implemented method of claim 18, wherein generating the light-enhanced object image includes:
generating the distortion classification utilizing the distortion classifier of the object-re-lighting neural network;
generating feature vectors utilizing an encoder network of the object-re-lighting neural network; and
generating the light-enhanced object image utilizing a generator of the object-re-lighting neural network from a combination of the distortion classification and the feature vectors.

20. The computer-implemented method of claim 18, further comprising:
tracking the object across a set of digital images that includes the digital image;
generating a set of object-enhanced digital images from the set of digital images utilizing the object-re-lighting neural network, wherein the set of object-enhanced digital images includes the enhanced digital image; and
providing the set of object-enhanced digital images for display on the computing device as an object-enhanced digital video.

* * * * *